(12) United States Patent
Gatter

(10) Patent No.: US 9,002,876 B2
(45) Date of Patent: Apr. 7, 2015

(54) INTERPRETED COMPUTER LANGUAGE TO ANALYZE BUSINESS OBJECT DATA WITH DEFINED RELATIONS

(75) Inventor: Juergen Gatter, Rauenberg (DE)

(73) Assignee: SAP SE, Walldorf (DE)

( * ) Notice: Subject to any disclaimer, the term of this patent is extended or adjusted under 35 U.S.C. 154(b) by 527 days.

(21) Appl. No.: 12/959,180

(22) Filed: Dec. 2, 2010

(65) Prior Publication Data
US 2012/0143896 A1 Jun. 7, 2012

(51) Int. Cl.
G06F 7/00 (2006.01)
G06F 17/30 (2006.01)

(52) U.S. Cl.
CPC .... G06F 17/30616 (2013.01); G06F 17/30607 (2013.01); G06F 17/30684 (2013.01)

(58) Field of Classification Search
CPC ............... G06F 17/30864; G06F 17/30867; G06F 17/30286; G06F 17/30595; G06F 17/30976; G06F 17/30401; G06Q 30/02
See application file for complete search history.

(56) References Cited

U.S. PATENT DOCUMENTS

| | | | | |
|---|---|---|---|---|
| 5,586,330 | A * | 12/1996 | Knudsen et al. | 717/136 |
| 6,216,169 | B1 * | 4/2001 | Booman et al. | 709/246 |
| 6,263,339 | B1 * | 7/2001 | Hirsch | 1/1 |
| 6,507,856 | B1 * | 1/2003 | Chen et al. | 715/205 |
| 6,643,633 | B2 * | 11/2003 | Chau et al. | 1/1 |
| 6,845,373 | B2 * | 1/2005 | Linhart | 1/1 |
| 6,925,635 | B2 * | 8/2005 | Garvey | 717/143 |
| 7,921,359 | B2 * | 4/2011 | Friebel et al. | 715/249 |
| 7,971,104 | B2 * | 6/2011 | Dolev et al. | 714/55 |
| 2003/0074190 | A1 * | 4/2003 | Allison | 704/10 |
| 2003/0221169 | A1 * | 11/2003 | Swett | 715/514 |
| 2004/0113930 | A1 * | 6/2004 | Hawley et al. | 345/700 |
| 2004/0154004 | A1 * | 8/2004 | Maine | 717/136 |
| 2004/0172234 | A1 * | 9/2004 | Dapp et al. | 704/1 |
| 2004/0230873 | A1 * | 11/2004 | Ward | 714/39 |
| 2004/0249645 | A1 * | 12/2004 | Hauser et al. | 705/1 |
| 2005/0091589 | A1 * | 4/2005 | Ramarao | 715/522 |
| 2005/0278353 | A1 * | 12/2005 | Norgaard et al. | 707/100 |
| 2006/0026582 | A1 * | 2/2006 | Collard et al. | 717/161 |
| 2006/0271920 | A1 * | 11/2006 | Abouelsaadat | 717/137 |
| 2007/0143247 | A1 * | 6/2007 | Brunswig et al. | 707/2 |
| 2007/0157182 | A1 * | 7/2007 | Zatloukal et al. | 717/140 |
| 2007/0220063 | A1 * | 9/2007 | O'Farrell et al. | 707/201 |
| 2008/0082484 | A1 * | 4/2008 | Averbuch et al. | 707/3 |

(Continued)

OTHER PUBLICATIONS

Ives et al., An XML Query Engine for Network-bound Data, Dec. 2002, Springer-Verlag New York, Inc., vol. 11, Issue 4, pp. 380-402.*

(Continued)

*Primary Examiner* — James Trujillo
*Assistant Examiner* — Jessica N Le
(74) *Attorney, Agent, or Firm* — Fish & Richardson P.C.

(57) ABSTRACT

The present disclosure is directed to systems and methods including receiving a source code at a parser, the source code comprising a statement, the statement comprising a dynamic character string including one or more relation names, each of the one or more relation names defining a relation between business objects, processing the statement using one or more processors to access at least one business object, the at least one business object being stored in machine-readable memory, the at least one business object corresponding to at least one of the one or more relation names, and having business object data associated therewith, and generating an output based on the business object data.

20 Claims, 14 Drawing Sheets

(56) References Cited

U.S. PATENT DOCUMENTS

| | | | |
|---|---|---|---|
| 2008/0178092 A1* | 7/2008 | Schmidt et al. | 715/736 |
| 2008/0295069 A1* | 11/2008 | Nicholls et al. | 717/106 |
| 2009/0070459 A1* | 3/2009 | Cho et al. | 709/224 |
| 2009/0106183 A1* | 4/2009 | Estan et al. | 706/48 |
| 2009/0138851 A1* | 5/2009 | Allen et al. | 717/122 |
| 2009/0193045 A1* | 7/2009 | Werner | 707/101 |
| 2009/0307664 A1* | 12/2009 | Huuck et al. | 717/124 |
| 2009/0313613 A1* | 12/2009 | Ben-Artzi et al. | 717/137 |
| 2010/0082600 A1* | 4/2010 | Xu et al. | 707/714 |
| 2010/0088666 A1* | 4/2010 | Box et al. | 717/104 |
| 2010/0169234 A1* | 7/2010 | Metzger et al. | 705/348 |
| 2010/0312549 A1* | 12/2010 | Akuwudike | 704/9 |
| 2011/0035733 A1* | 2/2011 | Horning et al. | 717/140 |
| 2011/0078211 A1* | 3/2011 | Gass et al. | 707/803 |
| 2011/0107357 A1* | 5/2011 | Cullimore | 719/328 |
| 2011/0179390 A1* | 7/2011 | Morris | 715/854 |
| 2011/0231435 A1* | 9/2011 | Bush et al. | 707/769 |

OTHER PUBLICATIONS

Rozsnyai et al., Concepts and Models for Typing Events for Event-Based Systems, Jun. 2007, ACM, pp. 62-70.*

"XPath 2.0," http://en.wikipedia.org/wiki/XPath_2.0 (last accessed on Dec. 2, 2010) (5 pages).

* cited by examiner

| No | Short | Explanation |
|---|---|---|
| 0 | EXPECT_RELATION | Start status, located on an object/collection and next step is needed. The next step is a relation, but can also be a structure definition (one time per query) or access to the structure or an attribute (this marks the end of the query then). |
| 1 | EXPECT_SLASH_OR_SORTDEF | This status is reached after a structure definition and either a slash or the sort definition or is allowed. |
| 3 | EXPECT_FILTER | A relation is consumed and now the definition of an assignment block or a filter (or a dollar sign if no dollar was read up to now) is possible. This status is reached after a filter or assignment block is consumed, so syntactically it is possible to define any number of filters / assignment blocks in any order. |
| 4 | DOLLAR_CONSUMED | Expecting either grouping definition or normal proceeding (Slash, Filter or Assignment block). |
| 5 | CHECK_FOR_EXCLAMATION_MARK | Consumes the exclamation mark if present, otherwise proceeds directly with DOLLAR_CONSUMED. |
| 6 | EXPECT_FIRST_OPERAND | The first operand is expected. This might be an atomic entity (string/numeric/bool/date literal or attribute or target) or a parenthesis indicating a new expression or a function or a sub-query. |
| 8 | EXPECT_FUNC_PARAMS | When reaching this status the machine proceeds with status 6 (first operand of expression) without reading further symbols, except the function has no parameters at all (e.g. today() ). The status puts comma on the stack if the last parameter has not been reached for the last a bracketclose. |
| 9 | EXPECT_GROUPING_DEF | Expects grouping definition parameter. |
| 10 | GROUP_TO_STAR_CONSUMED | A star was consumed as group definition, so group definition is finished. |
| 15 | EXPECT_OPERATOR | Operator sign is expected (i.e. + * -% = < > <> <= >= ). Note that the expression might contain only one operand ( i.e. in the assignment !TARGET = "Hello World" ). |
| 20 | EXPECT_2ND_OPERAND | Second operand is expected. Basically the same options as for the first operand. |
| 30 | EXPECT_CLOSE | Things are read and the return is to a level lower, typically a bracket / filter or index is closed. As with assignments a semicolon might trigger a new assignment also. |
| 40 | EXPECT_DOLLAR | End of the query, only a Dollar is expected to follow. |
| 41 | EXPECT_EOS | Now even the dollar has been read, nothing more to come. |
| 50 | EXPECT_TARGET | An assignment is expected, this can be either a star representing a move-corresponding" or a target definition. " |
| 51 | EXPECT_ASSIGNMENT | Assignment symbol (more exactly: = ) is expected. Any number of dereferenzation is also possible. |
| 52 | STAR_IN_ASSG_CONSUMED | Star was read, assignment or POP expected. |
| 53 | ASSIGNMENT_2_STAR | Only supported for sub-functions, hence SUB must be next token. |
| 70 | EXPECT_SORTDEF | Target or star as sort criterion expected. |
| 71 | EXPECT_COLLON_OR_NEXT | A colon may indicate option definition, otherwise next or sort definition ending must come. |
| 72 | EXPECT_SORTOPTIONS | Sort options must follow. Sort options are a limited set of string containing 'A', 'D' or 'T'. |
| 75 | EXPECT_CLOSE | Either next or end of sort definition. |
| 80 | EXPECT_GROUP_INIT | Assignment-block for group initialization. |
| 81 | EXPECT_GROUP_LOOP | Assignment-block for group loop. |

Table 1: Status Overview

FIG. 6

| IdentGroup | Identifier | Description | Token Nr | Token | Tokencontent |
|---|---|---|---|---|---|
| STRUCT | STRUCT | Structure | 401 | _STRUCTURE | ? |
| STRUCT | ENHSTRUC | Enhanceable Structure | 402 | _ENHSTRUCTUR | E? |
| STRUCT | NULLSTRUC | Empty Structure | 402 | _ENHSTRUCTUR | E |
| REL | OWNREL | . | 1 | _RELATION | . |
| REL | PARENTREL | .. | 1 | _RELATION | .. |
| REL | ROOTREL | ... | 1 | _RELATION | ... |
| REL | RELATION | Relation | 1 | _RELATION | ? |
| SLASH | SLASH | / | 2 | _SLASH | / |
| FILTERON | FILTERON | [ | 5 | _FILTER_ON | [ |
| INDEXON | INDEXON | ( | 3 | _INDEX_ON | ( |
| FILTEROFF | FILTEROFF | ] | 6 | _FILTER_OFF | ] |
| INDEXOFF | INDEXOFF | ) | 4 | _INDEX_OFF | ) |
| ATOMIC | NUMBER | Number | 503 | _NUMBER | ? |
| ATOMIC | STRING | String | 501 | _STRING | ? |
| ATOMIC | DATE | Date | 502 | _DATE | ? |
| ATOMIC | ATTR | Attribute | 301 | _ATTRIBUTE | ? |
| FUNCTION | FUNCTION | FUNCTION( | 22 | _FUNCTION | ? |
| SUB | F_SUB | SUB( | 22 | _FUNCTION | SUB |
| BRACKETON | BRACKETON | ( | 7 | _BRACKET_ON | ( |
| BRACKETOFF | BRACKETOFF | ) | 8 | _BRACKET_OFF | ) |
| OPERATOR | OPERATOR | Operator | 901 | _OPERATOR | ? |
| COMMA | , | , | 31 | _KOMMA | , |
| SEMICOLON | ; | ; | 952 | _SEMICOLON | ; |
| COLON | : | : | 754 | _COLON | : |
| DOLLAR | $ | $ | 9 | _DOLLAR | $ |
| EXCLAMATION | ! | ! | 506 | _EXCLAMATION | ! |
| STAR | * | * | 901 | _OPERATOR | * |
| ASSIGNMENT | ASSGN | local Assignment | 901 | _OPERATOR | = |
| ASSIGNMENT | ASSGNWR | global Assignment | 901 | _OPERATOR | := |
| TARGET | TARGET | Target | 989 | _VARIABLE | ? |
| OPTION | OPTION | Option | 1 | _RELATION | according to dynamic check |
| DEREF | DEREFTARG | Dereference operator | 799 | _DEREF | ! |
| DEREF | DEREFATTR | Dereference operator | 799 | _DEREF | @ |
| EOC | EOC | End of Code | -1 | _EOS | ? |

Table 2: Identifiers

FIG. 7

| Exception | Syntax Check | Model Check | Execution | Description | Example |
|---|---|---|---|---|---|
| CX_WCF_BPATH_PARSING_ERROR | X | X | X | General parsing error | ~*/+.*^1 |
| CX_CRM_UNSUPPORTED_RELATION | | X | X | relation unknown | ~*/PlumpaQuatsch |
| CX_CRM_GENIL_MODEL_ERROR2 | | X | | attribute unknown | ~*/.//@NoAttribute |

Table 3: Parser Exceptions

FIG. 8

| TextID | Syntax Check | Model Check | Execution | BPATH Example | SourceCodeDescription |
|---|---|---|---|---|---|
| CX_WCF_BPATH_PARSING_ERROR | X | | | '...*/;5' | Current token is not allowed at this place ((possible entries will be listed) |
| NUMBER_OF_PARAMS_MISSMATCH | | X | X | '...*/.{! A=Upper()}' | Number of parameters in statement does not match function declaration |
| PARAMETER_WRONG | | X | X | '...*/.{! A=Upper(1)}' | Parameter type does not match function declaration |
| INCOMPATIBLE_OPERATION_TYPES | | X | X | '...*/.{! A=Today() *"Hello"}' | Operation is not supported with specified types " |
| UNSUPPORTED_FUNCTION | | X | X | '...*/.{! A=Test(1)}' | There is no such thing as a function with this name |
| UNSUPP_TYPE_IN_TARGET_STRUCT | | X | X | | Creation of a target of used type is not supported |
| PARENT_REL_NOT_UNAMBIGUOUS | | X | *) | '...*/..' | Parent is either not there (we are already on root) or not unambiguous |
| PARENT_OBJECT_NAME_INCORRECT | | X | *) | '...*/...NoNsEnSe' | specified parent object name is incorrect |

Table 4: Example Issues

*) both dumps do not appear in code execution (more exactly PARENT_REL_NOT_UNAMBIGOUS only if no parent was found), however, the code may not fit to the object structures and consequently, it can not be guaranteed that the code is executed without problems and/or dumps.

FIG. 9

| | String | Num | Date | Bool |
|---|---|---|---|---|
| & | S & S -> S (concat) | | | B & B -> B (and) |
| \| | | | | B \| B -> B (or) |
| + | S + S -> S (concat)<br>S + N -> S | N + N -> N (add)<br>N + S -> N | D + N -> D | B + B -> B (or) |
| - | S - S -> S<br>S - N -> S | N - N -> N (substr.) | D - N -> D | B - B -> B |
| * | S * N -> N<br>S * B -> S | N * N -> N (mlt) N * B -> N *g | D * B -> D | B * B -> S (and / if) |
| % | S % S -> S<br>S % N -> S | N % N -> N (Div) | | B % B -> B |
| Comp. | S X S -> B | N X N -> B | D X D -> B | B X B -> B |
| NOT | NOT(S) -> B | NOT(N) -> B | NOT(D) -> B | NOT(B) -> B |
| UPPER | UPPER(S) -> S | | | |
| IFF | | | | IFF(B,X,X) -> X |

Table 5: Operations

FIG. 10

| Name | Main Parameters | Optional Parmeters | Description |
|---|---|---|---|
| COUNT | no | B | counts all elements where the condition evals to true |
| SUM | N | no | sums up handed over value |
| PRODUCT | N | N | multiplizes handed over entries. Optional parameter provided possibility to round the return |
| MIN | SDNB | SDNB | returns second parameter for the first found global minimum. If second parameter is not supplied first parameter will be returned |
| MAX | SDNB | SDNB | maximum, equivalent to minimum |
| AVG | DN | N | returns arithmetical average. Optional parameter provided possibility to round the return (not in case of date values), e.g. 0 rounds to whole digits, 2 to 2 decimal places. |
| GEOAVG | DN | N | returns geometrical average. Optional parameter see AVG. |
| FIRST | SDNB | no | returns entry from first row |
| LAST | SDNB | no | returns entry from last row (equivalent to the usage of the parameter directly) |
| GRPINDEX | N, SDNB | no | returns entry from row specified with parameter 1. Negative indexing is not possible here, since the size of the group is not known. |
| ANY | SDNB | no | returns one of the rows chosen by equal probability |
| STDEV | N | N | returns standard deviation. Optional parameter provided possibility to round the return. |
| CONC | S, S | B | concatenates first parameter separated by second parameter. Optionally only rows which fulfill the condition specified as third parameter are taken into account. If all rows evaluate to false, an empty string will be returned. |
| SEARCH | B | SNDB | returns parameter 2 belonging to row where condition is met. This means typically the last row fulfilling the condition, or, in case parameter 2 includes its own target an handmade aggregation of all found rows (see examples) |
| SEARCHFIRST | B | SNDB | returns parameter 2 belonging to first row where condition is met. |
| MEDIAN | SND | no | returns median element from the list of attributes |

Table 6: Aggregations

*FIG. 11*

INTERPRETED COMPUTER LANGUAGE TO ANALYZE BUSINESS OBJECT DATA WITH DEFINED RELATIONS

BACKGROUND

The XML path language (XPATH) is a query language that can be used to select nodes from an extensible mark-up language (XML) document, and can be used to compute values (e.g., strings, numbers, or Boolean values) from content of an XML document. The XPATH language is based on a tree representation of the XML document, and provides the ability to navigate around the tree, selecting nodes by a variety of criteria. XML data is organized as a hierarchical, finite tree, where XML names are associated with XML objects. This is not the case for business data. The inner organization of the data of business objects may be neither hierarchical nor finite, because loops can occur. Further, output provided by XPATH is less flexible than desired. For example, XPATH statements are designed to filter the original, available data. Accordingly, XPATH is not readily applicable for analyzing business object data in desired manners.

SUMMARY

Implementations of the present disclosure include methods for accessing non-hierarchical business objects that can include a non-finite structure. In some implementations, a method includes receiving a source code at a parser, the source code comprising a statement, the statement including a dynamic character string including one or more relation names, each of the one or more relation names defining a relation between business objects, processing the statement using one or more processors to access at least one business object, the at least one business object being stored in machine-readable memory, the at least one business object corresponding to at least one of the one or more relation names, and having business object data associated therewith, and generating an output based on the business object data.

In some implementations, the statement includes a structure definition that defines a return structure, the output corresponding to the return structure. In some implementations, the return structure includes a table. In some implementations, the statement further includes a code segment indicating a field, the field being added to the return structure. In some implementations, the method further includes adding the field to the return structure in response to the field being used as an assignment target within the source code.

In some implementations, the return structure includes a plurality of fields.

In some implementations, the at least one business object is a member of a collection of business objects, business objects in the collection of business objects being identified in response to a query.

In some implementations, the statement defines a target structure including one or more fields and an assignment of data values to the one or more fields, and processing includes pushing one or more data values of the business object data to the one or more fields based on the assignment.

In some implementations, the statement defines a plurality of assignments of data values to a plurality of fields, and processing includes pushing one or more data values of the business object data to the plurality of fields based on the plurality of assignments.

In some implementations, the statement defines a transposition of business object data, such that a column associated with the business object data is provided as a row in the output.

In some implementations, the statement defines the output to be provided as a table that is composed of a first table having a first number of rows and a second table having a second number of rows different that the first number of rows. In some implementations, fields are incrementally added to the table and each field of the table corresponds to a field of each of the first table and the second table.

In some implementations, the output is based on one or more sub-queries, each of the one or more sub-queries providing data, the statement providing a sort order such that the data is sorted based on the sort order. In some implementations, a result of at least one of the one or more sub-queries includes a table.

In some implementations, the statement defines one or more data groups, each data group corresponding to a type, and processing includes grouping business object data into each of the one or more groups based on the type.

In some implementations, the statement defines one or more calculations that can be performed on business object data, and processing includes performing the one or more calculations on data of at least one or the one or more data groups.

In some implementations, each business object comprises a virtual instantiation of database content.

In some implementations, the relations and business objects define a non-hierarchical structure including at least one loop.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIG. 6 depicts Table 1, which provides a status overview.

FIG. 7 depicts Table 2, which provides a list of example identifiers.

FIG. 8 depicts Table 3, which provides example parser exceptions.

FIG. 9 depicts Table 4, which provides example issues that can be returned in response to an example exception.

FIG. 10 depicts Table 5, which provides a list of example operations.

FIG. 11 depicts Table 6, which provides a list of example aggregations.

Like reference symbols in the various drawings indicate like elements.

DETAILED DESCRIPTION

Implementations of the present disclosure are generally directed to an interpreted computer language (as opposed to a compiled computer language), hereinafter referred to as BPATH, to analyze business object data having defined relations therebetween. More particularly, as an interpreted computer language, statements provided in source code are directly executed without translation to a different computer language (e.g., machine-readable code). A compiled computer language, on the other hand, is translated to a different language using a compiler, making the code executable. BPATH enables access to business object layer (BOL) objects controlled by a dynamic character string. Business object data may be neither hierarchical nor finite. More specifically, a business object and the data provided therein is finite in and of itself, however, the relations between the data within a business object may be non-hierarchical and infinite (e.g., loops). Because hierarchy and finiteness (i.e., the path from the root object) are not guaranteed for even a root business object, there is no way to scan the complete business object data tree using traditional languages (e.g., XPATH). As discussed in further detail herein, BPATH accesses business object data and returns either a flat collection of business objects or a data structure. A business object can include a virtual instantiation of database content. In some implementations, a business object represents a specific view of well-defined and outlined business content, and can be defined free of business functionality redundancies.

Figure 1:
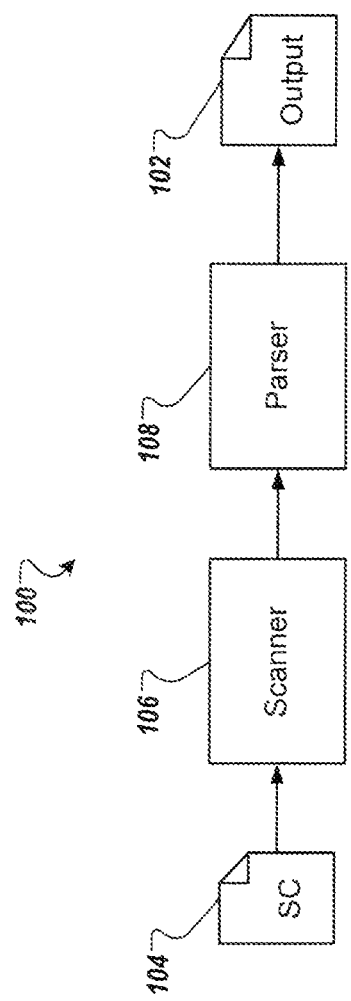
FIG. 1 is a schematic illustration of an example system architecture that can be used to execute implementations of the present disclosure.

FIG. 1 is a schematic illustration of an example interpreter 100 for generating an output 102 from human-readable source code 104 in accordance with implementations of the present disclosure. The example interpreter 100 includes a scanner 106 and a parser 108. The scanner 106 provides lexical analysis of the source code 104 and generates tokens based thereon. The parser 108 provides syntactical and semantical analysis of the tokens and generates data structures to provide an intermediate representation of the source code. The interpreter executes steps that are read from the source code and is controlled by a high-level computer language. An example high-level language includes the Advanced Business Application Programming (ABAP) language from SAP AG, Walldorf, Germany.

In accordance with implementations of the present disclosure, the interpreter 100 can include a BPATH interpreter that is provided in an example object: CL_WCF_BPATH_PARSER, which handles scanning, parsing and statement execution. A sub-object (e.g., CL_WCF_BPATH_STACK) can be used, which implements stack functionality. The scanner 106 can be provided in an example method: SCAN_NEXT. The scanner 106 has no context information besides the source code 104 (e.g., GV_SOURCECODE), the length of the source code (e.g., GV_SOURCELEN) and the current program counter (e.g., GV_PRGCNT). The scanner 106 can be provided as a case statement acting on the current character of the BPATH string. In some implementations, a one character look-ahead can be used (e.g., to distinguish <from <= or <>). The scanner 106 generates the tokens and populates the token attributes (e.g., GV_TOKEN, GV_TOKENTYPE and GV_TOKENCONTENT).

In some implementations, a stack machine approach is implemented to overcome known limitations of a top-down parser. In some implementations, the stack machine can be provided as a version of a theoretical stack machine and can include an input stream, a plurality of stacks, each stack holding information derived from already analyzed input, a defined status of the stack machine, an action (or transition) table that defines the syntactical proceedings on the actual combination of input, status and stack, and an output. In some implementations, the action table prescribes to which new state the stack should move. The stack machine implements a newly introduced stack class, a plurality control tables, and a simple parsing algorithm. In some implementations, the stack class provides stack features that can include pushing an element onto the stack ("PUSH"), removing and returning the top-most entry of the stack ("POP"). In some implementations, the stack can provide enriched features. Example enriched features can include attributing a stack element with a string (e.g., put 19 on stack with the attribute "NUMBER"), checking whether the top-most entry of the stack is attributed according to specified requirements. (e.g. CHECK("NUMBER") is true or false), providing alternatives (e.g., putting 19.25 on the stack together with the alternative "Nineteen" with the attribute "STRING"). In some implementations, a plurality of alternatives can be provided, where one or more of the alternatives include an additional feature that the returned entry remains on the stack instead of being removed. Such alternatives can be referred to as a "shadow." Another enriched feature can include the pop operation being called with an attribute, and returns either the original value or the alternative, corresponding to fitting of the attribute. Similar possibilities can apply to the CHECK operation. As discussed in further detail herein, the control tables hold information that is relevant to syntactical parsing. A basic process is provided in the example pseudo-code:

```
Initialize( )
While not finished
    Ci = Retrieve_control_information ( input, status )
    If ci is empty then raise error
    If Process Action ( Ci ) is successful
    Status = adapt_status ( Ci )
    Else
    Status = Rollback_and_take_next ( Ci )
    End
wend
```

Tasks are distributed by assigning analysis of the current situation, execution and status handling to the corresponding methods. The next token is scanned and is checked against the control table to determine the next step that is to be executed. If no step is possible, a parsing error is raised. If a step is possible, the next step is executed and can provide feedback, at which point execution ends (e.g., a filter blocks execution, a relation returns no objects). Based on this information, the status is updated together with the program counter.

Token information is cached. In particular, performance can be degraded by reading input again and again. Consequently, a caching table is provided and holds the already known information. In some implementations, the caching table is called GV_STATEMENT_TAB (e.g., of type CRMT_ BOL_BPATH_STATEMENT_TAB), and the information is populated in the caching table the first time the respective code part is accessed. Control information is also written to the caching table. To do this, the following conditions are maintained: input is read from left to right without jumps; and no other information, besides the input, is used to derive the control information. In this manner, it is ensured that the second time a code fragment is accessed, the same decision as stored in the cache results is derived.

The stack is implemented in the example class: CL_WCF_BPATH_STACK. A data structure (e.g., CRMT_ BOL_BPATH_EXPR_VALUE) can be used, which is able to hold strings, dates, numerical, Boolean values and references (e.g., both to object and to data). For most of the data types, standard stack application program interfaces (APIs) can be used. Example stack APIs include push, pop, and top-of-stack (TOS) are provided. In some implementations, the stack is provided as an attributed stack with shadow elements. Specifically, each element that is put onto the stack has an attribute that can be provided as a string. A test operation (e.g., Testattribute) can be performed against the stack. The test operation can return true, if the test attribute corresponds to the attribute at the top of the stack. The shadow element (or next element) is used to provide alternatives, as discussed above. In some implementations, the shadow element can be selected based on the attribute with slightly different behavior. If the shadow element is selected, the element remains on the stack even after a pop operation.

In some implementations, the status machine uses a plurality of stacks that can work as standard stacks. A status stack (e.g., StatusStack) can be implemented to control the status of the stack machine. A data stack (e.g., DataStack) can be implemented to control data flow in expressions. An object stack (e.g., ObjectStack) can be implemented to hold the various BOL objects and collections. In some implementations, other example stacks can include a parameter stack that is temporarily used for evaluation of function parameters, a function stack that holds information regarding surrounding functions, a sub-query stack that holds information regarding surrounding sub-queries, and a group definition stack that holds information regarding grouping definitions. For assignment handling, the pointer points to the status after the assignment is closed (e.g., status=3) together with the corresponding attribute (e.g., INDEXOFF="}"). Several assignments may follow each other (e.g., separated by a semi-colon ";"). Consequently, the potential status 50 (e.g., Table 1 of FIG. 6 and corresponding discussion) is added as a shadow element having the corresponding attribute ";". Status is discussed in further detail herein, with reference to FIGS. 2A-4.

The stack machine operates based on the input and on the control table. Consequently, all information that is relevant to the syntactical parsing is stored in a control table. The control table is built as soon the parser (e.g., the parser 108 of FIG. 1) is instantiated. In some implementations, the control table may be changed at run-time. Changing of the control table at run-time can be used dynamic handling of functions, for example. The information stored in the control table includes the possible ways information can be put into the stack from each and every status. An example row in a control table can read:

From status 20 [operator 2 expected] you may get to status 6 [operator 1 expected] in case a bracket on is consumed. In this case you have to put status 30 [Expression Close] to the stack with the attribute Bracket off.

FIG. 7, discussed in further detail below, provides an example identifier table. The identifier table is constructed with the control table. The identifier table contains the mapping of the token to the identifiers as well as the information used to provide input possibilities for the syntactical parts.

A BPATH query can start either on a BOL object or on a collection of BOL objects. In some implementations, and the case of a collection, the BOL objects in the collection can all be of the same type. A standard collection returned by a query can be converted to the unique type beforehand. In some implementations, and if a collection includes objects of different types, the collection can be split into sub-collections based on type, each object within a sub-collection being of the same type. A query can start on the sub-collection corresponding to the unique type. By way of example, GET_RELATED_ENTITIES_BY_BPATH returns a BOL collection. It is responsibility of the caller that the BPATH code refers to the correct method. If, for example, GET_RELATED_ENTITIES_BY_BPATH is called, and the BPATH code refers to an attribute, an empty object reference is returned (and vice versa).

Figure 2A:
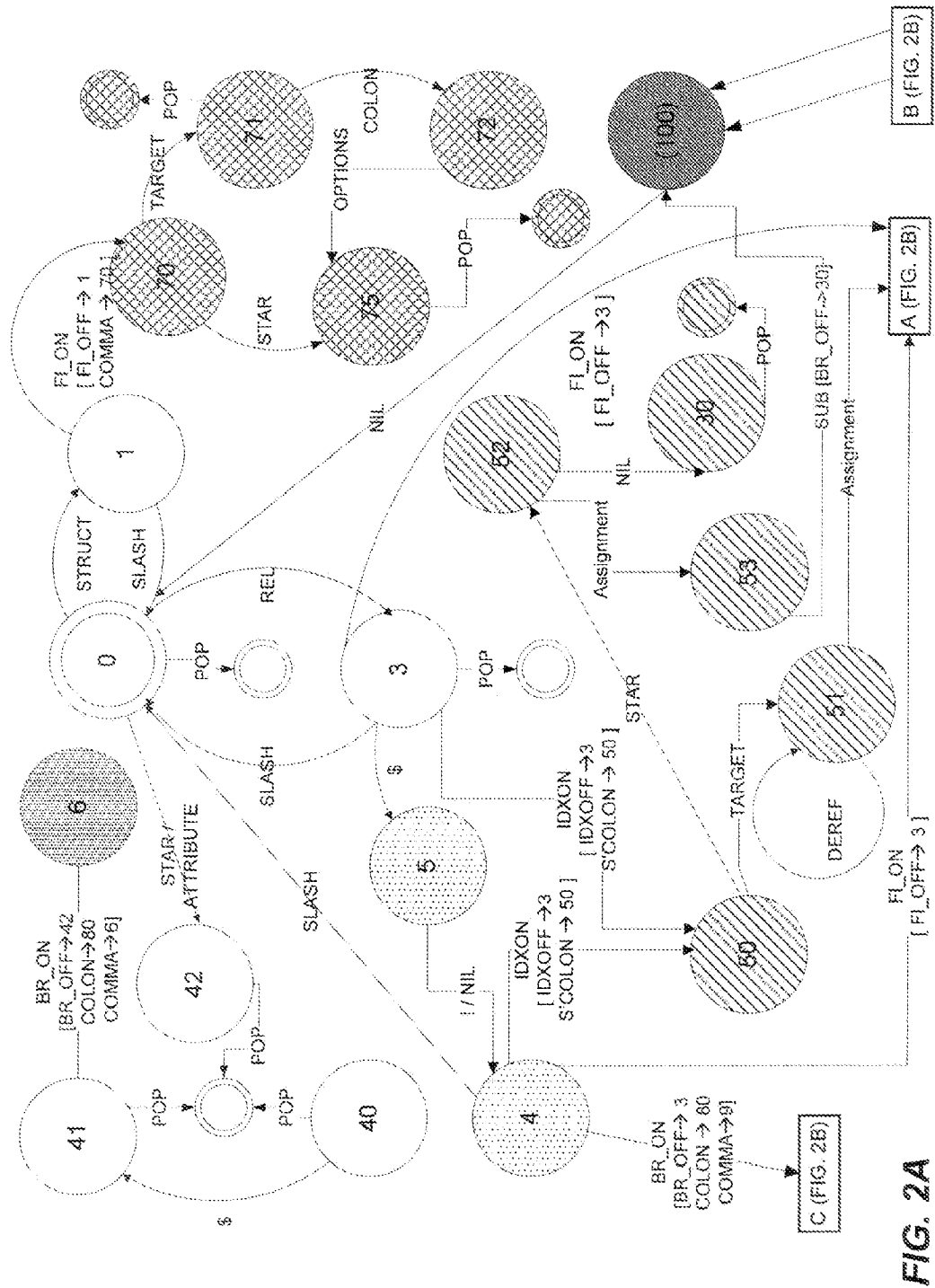
FIGS. 2A and 2B provide a syntax diagram corresponding to implementations of the interpreted computer language of the present disclosure.
Figure 2B:
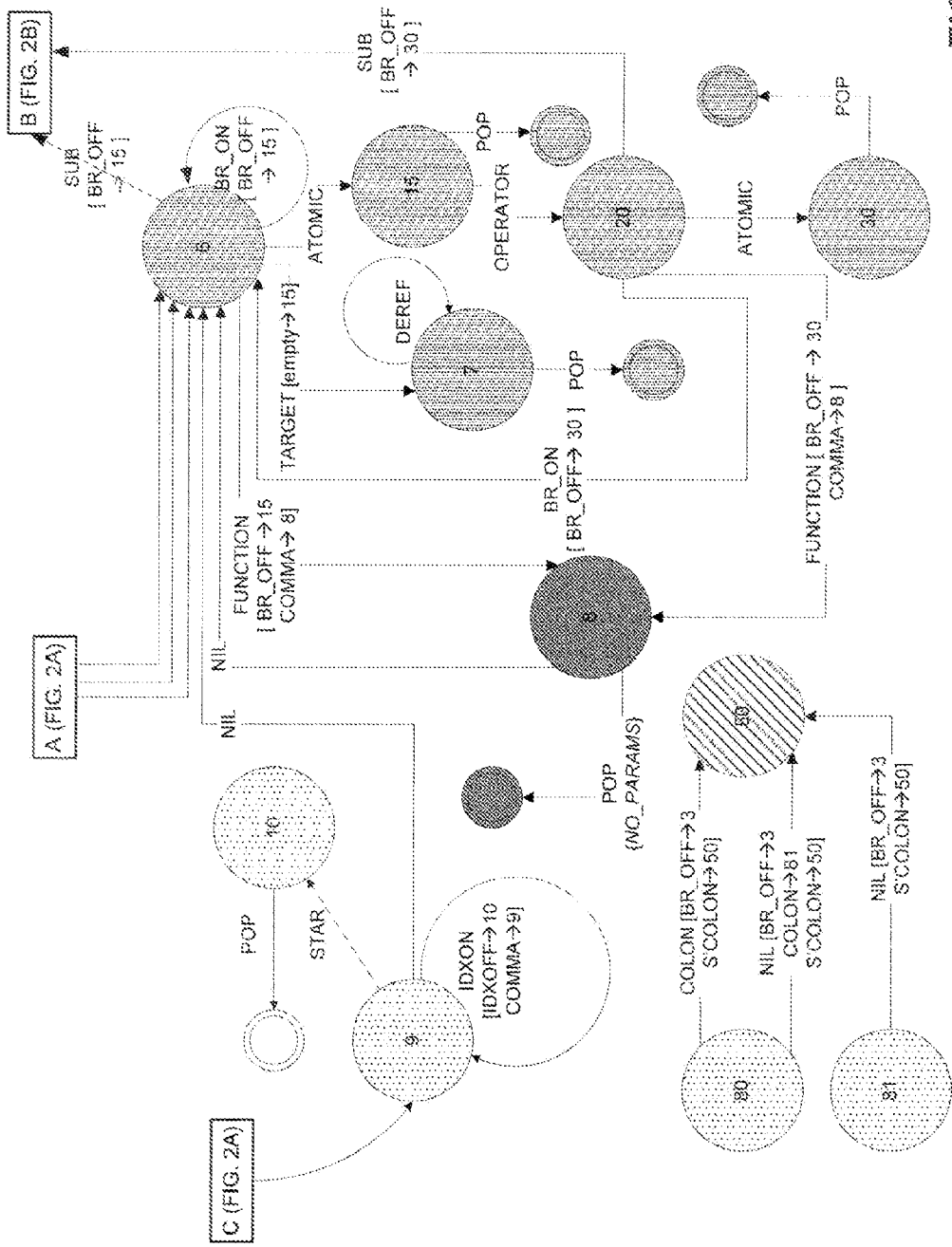
Figure 3:
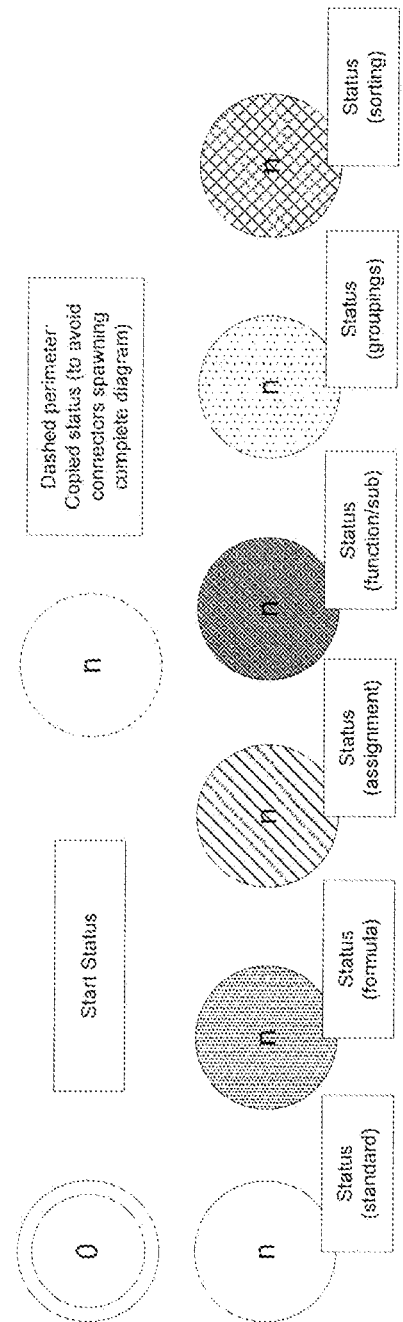
FIG. 3 is a first legend corresponding to the syntax diagram of FIGS. 2A and 2B.
Figure 4:
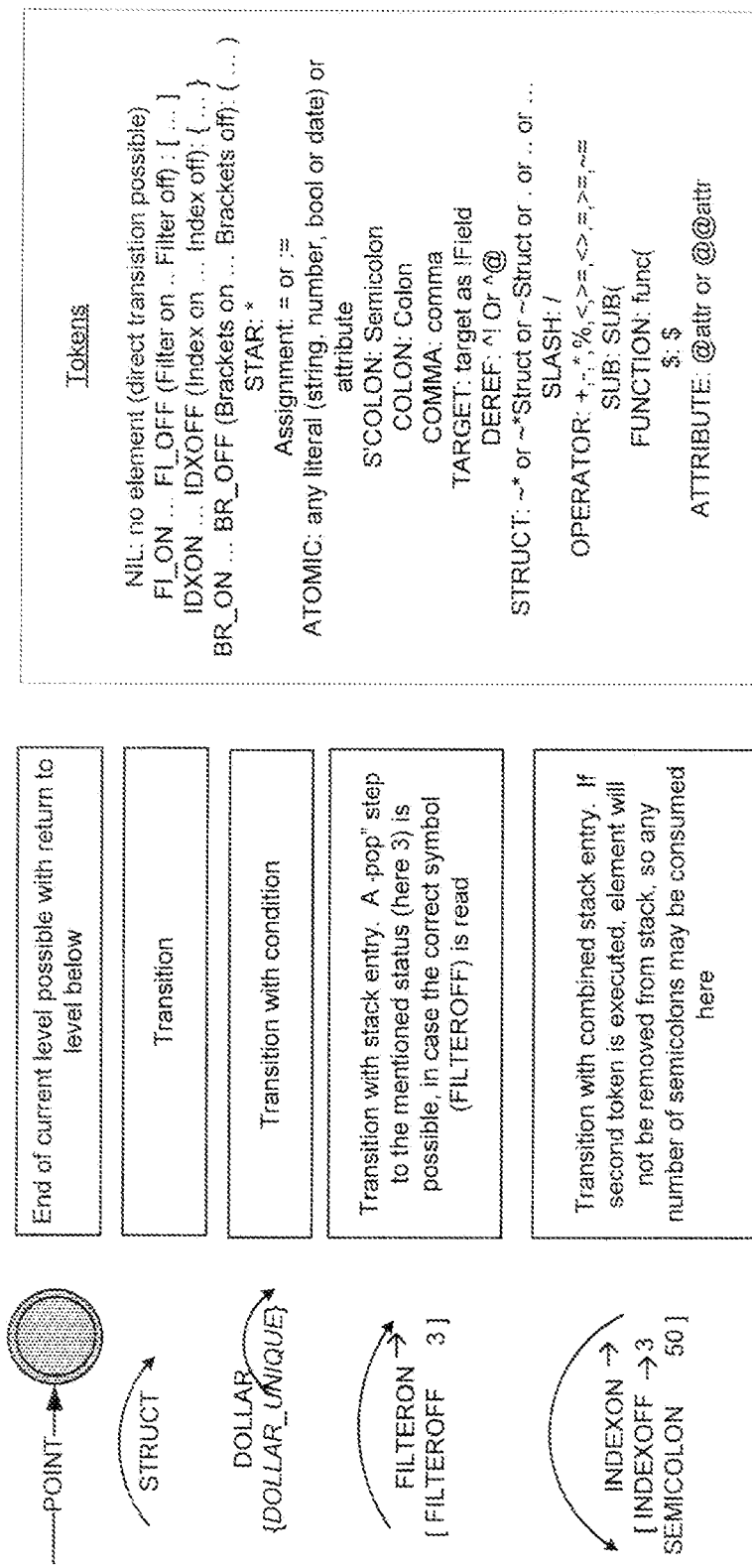
FIG. 4 is a second legend corresponding to the syntax diagram of FIGS. 2A and 2B.

FIGS. 2A and 2B provide a syntax diagram corresponding to implementations of BPATH. FIGS. 3 and 4 provide legends corresponding to the syntax diagram of FIGS. 2A and 2B. The syntax diagram illustrates a plurality of status groups, provided as circles, and tokens, provided as connectors, that indicate transitions between statuses. With particular reference to FIG. 3, the status groups correspond to a start status, a standard status, a formula status, an assignment status, a function or sub-function status, a groupings status and a sorting status. Circles having a dashed perimeter indicate a copied status. With particular reference to FIG. 6, Table 1 provides a status overview and provides a brief explanation of a plurality of example statuses.

The parser uses several terms when dealing with scanning and token identification to differentiate between a token, an identifier and an identifier group. To separate the terms and use cases, tokens and identifiers will be discussed in further detail. A token is the entity generated and returned by the scanner based on the source code and is context free (i.e., all tokens can be determined without any syntax information). One source code character is read in advance (e.g. to differentiate between "<" and "<="). A token is unique and the result based on the string of source code is clearly defined. Each token can include an identifier, a type and content. The identifier (e.g., int2) is provided for every entity such as "NUMBER," "ATTRIBUTE," "FILTER ON," "COMMA," and "OPERATOR." The type can be used to further separate tokens from each other (e.g., separate "COMPARISON" and "BOOLOP"). The content (Tokencontent) stores the value of the token. This can include a substring read from the source code (e.g. "<=") with some pre-parsing (e.g., Tokencontent of the attribute @NAME is "NAME"). In some cases, complex operations can be performed during scanning, such that the string parsing enables the use of double quotes in a string. As an example, the source code (without surrounding quotes) "@FULLNAME<>"PETER ""FOX""" produces the following token triples: ATTRIBUTE/-/FULLNAME, OPERATOR/COMPARISON/<>, and STRING/-/PETER "FOX".

With particular reference to FIG. 7, Table 2 provides a list of example identifier groups with corresponding identifiers and tokens, where ? represents variable entries. In contrast to a token, an identifier may need syntactical context information to be determined (i.e., is not context free). Together with the above read token, the current status uniquely identifies the correct identifier. In most cases, the token already defines the identifier. In some cases, the token itself is insufficient to determine the identifier. As an example, * is used as a synonym for the move-corresponding operation as well as the multiply operator. As another example, The same is valid for =, which is used both for comparisons and assignments. The identifiers support the input of source code. In some implementations, the already entered text may be pre-parsed, the current status evaluated and a collection of possible following identifiers may be extracted. For example, using the start status 0, and besides the POP operation (which in this case either indicates the end of a string or the end of a subquery using a ")"), the following example identifiers are allowed: STRUCT, NULLSTRUC, ENHSTRUC, OWNREL, PARENTREL, RELATION, *, and ATTR. The identifier group is used for purposes of clarification of the syntax diagram of FIGS. 2A and 2B to identification of all possible identifiers within the syntax diagram. For example, the identifiers STRUCT, ENHSTRUCT and NULLSTRUCT are all indicated using the identifier group STRUCT in the syntax diagram of FIGS. 2A and 2B.

Referring now to FIGS. 8 and 9, Table 3 illustrates example parser exceptions and Table 4 illustrates example issues that can be returned, respectively. The example parser exceptions of Table 3 are possible during syntax check, model check or execution of a BPATH statement. Table 4 provides example issues that can be returned for the exception class CX_WCF_BPATH_PARSING_ERROR, of Table 3. Dumps, indicated by *), do not appear in code execution, but it is likely that the code does not fit to the object structures. Consequently, it is not guaranteed that the code is executed without problems and/or dumps. The dumps return the code position as source code extract, where the program pointer is visualized using '_'.

Figure 5:
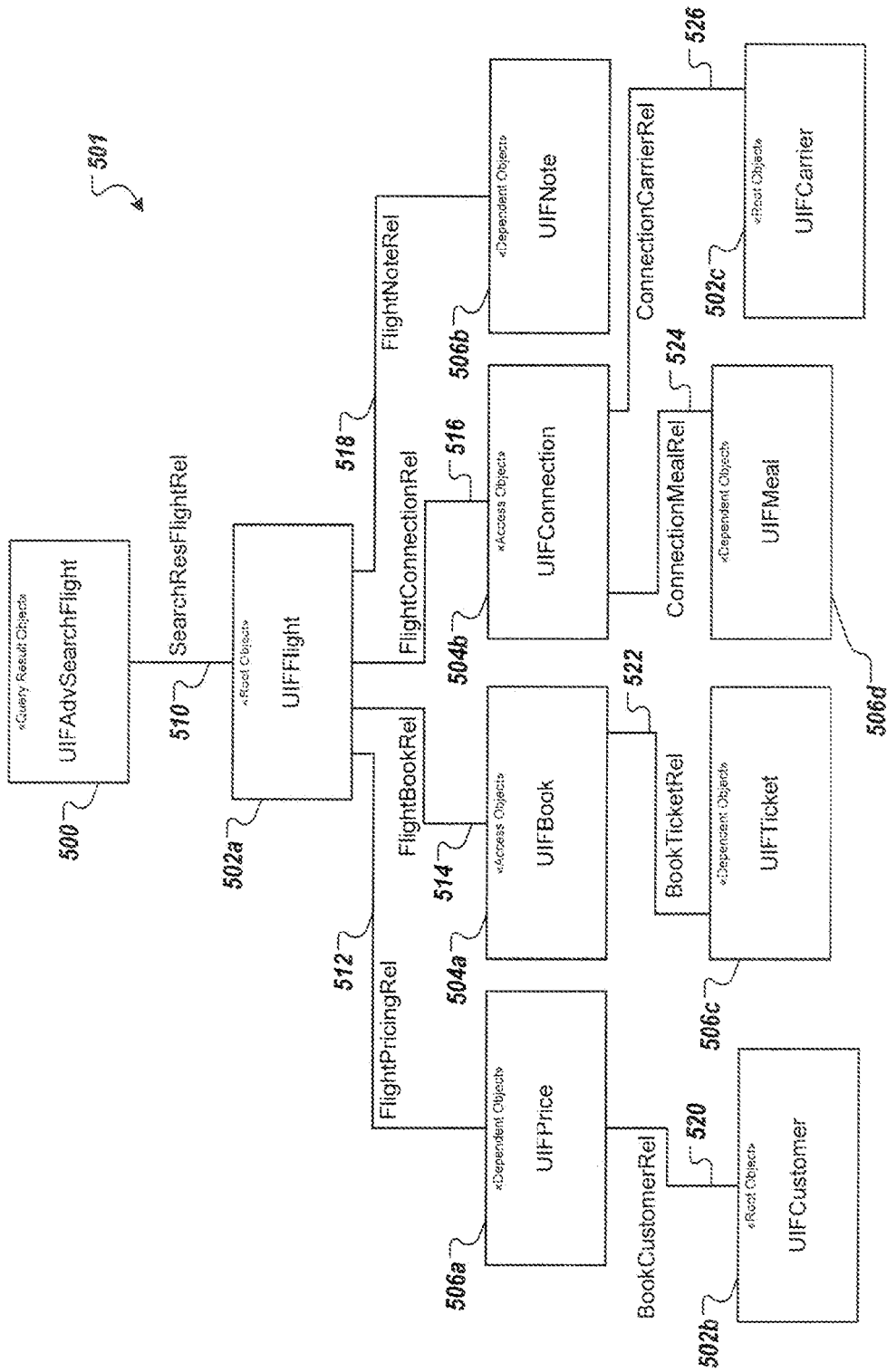
FIG. 5 is a block diagram of example business objects and example relations therebetween.

Referring now to FIG. 5, an example business object model 501 illustrated. gThe business objects and object relations of FIG. 5 provide an example structure for understanding example BPATH code statements provided herein. The example business object model 501 corresponds to a FLIGHT model for an example flight reservation system. The example business objects of the model 501 include a query result object (UIFAdvSearchFlight) 500, root objects (UIFFlight) 502a, (UIFCustomer) 502b, (UIFCarrier) 502c, access objects (UIFBook) 504a, (UIFConnection) 504b, and dependent objects (UIFPrice) 506a, (UIFNote) 506b, (UIFTicket) 506c, (UIFMeal) 506d. The example relations include a relation (SearchResFlightRel) 510 between the query result object 500 and the root object 502a, a relation (FlightPricingRel) 512 between the root object 502a and the dependent object 506a, a relation (FlightBookRel) 514 between the root object 502a and the access object 504a, a relation (FlightConnectionRel) 516 between the root object 502a and the access object 504b, and a relation (FlightNoteRel) 518 between the root object 502a and the dependent object 506b.

The example relations further include a relation (BookCustomreRel) 520 between the dependent object 506a and the root object 502b, a relation (BookTicketRel) 522 between the access object 504a and the dependent object 506c, a relation (ConnectionMealRel) 524 between the access object 504b and the dependent object 506d, and a relation (ConnectionCarrierRel) 526 between the access object 504b and the root object 502c.

BPATH will now be described in further detail by way of non-limiting code examples based on the model 501 of FIG. 5. In the example model 501 of FIG. 5, all queries base on the return of the query result object (UIFAdvSearchFlight) 500. The example code statements provided herein are based on the objects 500, 502a, 504a and 504b, however, the object names typically do not appear in the BPATH query code. In some cases, such as an attributed parent relation, object names can appear in the BPATH code query. In general, the relations (e.g., the relations 510, 514, 526) are provided in the BPATH code query.

As noted above, BPATH starts with either a BOL object or a collection of BOL objects. The following code fragments (provided in ABAP) provide a non-limiting example of how this can be achieved:

```
DATA IV_COMPSET type CRMT_GENIL_APPL.
DATA: lv_bol_core TYPE REF TO cl_crm_bol_core.
DATA: lv_dyn_query TYPE REF TO cl_crm_bol_dquery_service.
DATA: lv_result type ref to IF_BOL_ENTITY_COL.
iv_COMPSET = 'UIF'.
lv_bol_core = cl_crm_bol_core=>get_instance( ).
lv_bol_core->start_up( iv_compset ).
lv_dyn_query =
cl_crm_bol_dquery_service=>get_instance( 'UIFAdvSearchFlight' ).
lv_dyn_query->set_property( iv_attr_name = 'MAX_HITS'
iv_value = '5' ).
lv_result = lv_dyn_query->get_query_result( ).
```

The result of the example code fragments includes a collection, from which one or more starting points can be extracted. A single starting point can be defined using the following example code fragment:

```
DATA: lv_element type ref to cl_crm_bol_entity.
lv_element = lv_result->GET_LAST( ).
```

Of course, the first element of the collection could be used.

A collection of starting points can be defined. As noted above, a collection of objects of unique type can provide the starting points. The following example code fragment can ensure that the collection of starting points include the unique type:

```
DATA lv_result2 type ref to CL_CRM_BOL_ENTITY_COL_UT.
lv_result2 ?=
CL_CRM_BOL_ENTITY_COL_UT=>Convert( lv_result ).
```

One code example includes the single character * that can be deemed to be the shortest useful BPATH statement. The statement * indicates retrieving the attribute structure. Referring again to the syntax diagram of FIG. 2, the statement * is the shortest way out of the starting status (i.e., status=0). The statement * returns the complete attribute structure of the object that is the starting point. In the case of a collection as the starting point, the structure of the first object in the collection is returned.

An example statement @CARRID corresponds to retrieving attributes, where CARRID is an attribute of the attribute structure of the UIFAdvSearchFlight, which holds the identification of the flight carrier. The statement @attr indicates retrieving an attribute. The path is the same but the length is slightly longer, because any attribute name includes at least one character. The @ character is generally used to indicate attributes of an object, and the code will return the CARRID attribute of the current object with the respective type.

Example code statements can be used to define paths. One path can include a reflexive path. The reflexive path embodies a relation between an entity (business object) and itself, which can be described as a reflexive relation. The statement ./ indicates a reflexive relation. Several concepts are introduced here: the concept of a relation, the separation of relations using the slash (/) and the representation of the relation of an entity to itself using a single dot (.).

Another example code statement encompasses relations to other entities (business objects). Using such statements, the source code returns the attribute structure of the first object that is found, if any object is found. If no object is found, the returned reference remains initial. As discussed above, only relation names are provided in the BPATH source code.

The following relations example can be considered:
 SearchResFlightRel/FlightBookRel/*
In this example, a / is the beginning with the UIFSearchResFlight object (query result), the SearchResFlightRel leads to a UIFFlight object (root), the second relation FlightBookRel leads to a UIFBook object (access) returning the corresponding attribute structure of type CRMS_BOL_UIF_TRAVEL_BOOK_ATT.

Another code example, . . /* illustrates a parent relation, which is defined for every object except root objects, which do not have a parent. The parent relation is represented by two dots (. . ) following standard patterns. The parent relation returns the parent object, whereas normal relations return a collection.

Another code example, $, includes add to table. The following example, building on the relations example above, is provided:
 SearchResFlightRel/FlightBookRel/*$
Up to the $ character, evaluation of the statement would stop after the first entry is found and the corresponding attribute structure was returned. The $ character indicates a return of all data, which means that now a table (of structures or of the attribute) is returned. This is also the case if only one entry is found. The $ character may appear after any relation, but, as it is used in the above example, it is added at the end.

In the examples provided above, the structure of the returned entity is set implicitly and refers to the attribute structure of the corresponding object. In some circumstances, this may not be desired. Consequently, the structure can be explicitly set. Another code example, ~STRUC, indicates a normal structure. The following example statement can be considered:
 ~CRMS_BOL_UIF_TRAVEL_BOOK_KEY/SearchResFlightRel/FlightBookRel/*$
In this example, the attribute structure (i.e., CRMS_BOL_UIF_TRAVEL_BOOK_ATT) is not used to return the data. Instead, the key structure (CRMS_BOL_UIF_TRAVEL_BOOK_KEY) is used, which includes a plurality of fields (e.g., 4). The data is filled using a move-corresponding statement. It is responsibility of the caller to see that the structures match (i.e., the move-corresponding statement does not copy data to fields having the same name but being of a different type). Consequently, the structure definition can be placed directly at the beginning of the statement, even though the syntax allows otherwise.

Another code example, [2], enables basic filtering. The brackets [ ] clasp the filtering, and further evaluation is achieved when the filtering has been achieved. The following example can be considered:
 SearchResFlightRel/FlightBookRel[2]/*$
In this example, only the second entry of the second relation is provided in the result table. The filtering relates to the most current relation. If this example is used on a relation, the statement would return the second booking for every flight of the collection. Further, the filtering can be applied to every relation specified. Syntactically, several filters can be applied on one relation, even though the result will be the same as if a corresponding conditional filter, discussed below, is applied.

Other code examples provide conditional filtering. These code examples include:

[@CLASS="C"]
basic conditional filtering, string literals
[(@CLASS<>"C") &(@ FORCURKEY=@LOCCURKEY)]
comparisons and Boolean operations
[(@SMOKER+@INVOICE)="X"]
basic arithmetic operations With regard to basic conditional filtering, the following example statement can be considered:
 SearchResFlightRel/FlightBookRel[@CLASS="C"]/*$
There are two ways to filter: the first includes operation on the index, as discussed above, and the second includes using Boolean operations. If the example statement is evaluated to be true, the current element is evaluated further and, if the evaluation returns one or more valid object, their attribute structures are added to the return or are returned directly. If the example statement is evaluated to be false, the next entry is reviewed. String laterals are built using double quotes. It is possible to mask a double quote by stating two double quotes in advance.

Filtering is not restricted to simple comparisons with the equal (=) operator. More complex filtering is illustrated considering the following example:

SearchResFlightRel/FlightBookRel[(@CLASS<>"C")&(@FORCURKEY=
@LOCCURKEY)]/*$

In this example, another comparison operator, <>, is implemented. Other example comparison operators that can be implemented include <, >, <=, >=, <>, =. It is also possible to use the Boolean functions "and" (using &) and "or" (using |). FIG. 10 illustrates Table 5, which provides example operations supported by BPATH. The example operation "D+N−>D" adds a number of days (N) to a date (D), and the example operation "D−N−>D" subtracts a number of days from a date. The example operation "S+N−>S" converts a number into string (as provided by ABAP) and concatenates it to the given string. The example operation "N+S−>N" converts a string into a number (as provided by ABAP) and adds it to a number. The example operation "S−S−>S" replaces the first occurrence of a sub-operation within an operation with an empty string. The example operation "S−N−>S" removes the last n characters from a string, if N<=string length. The example function "S*N−>N" provides string multiplication. if N>0 (e.g., "la" * 3="lalala"). The example operations "S*B−>S,"

"N*B->N," and "D*B->D" provide logical if, such that, if the Boolean value is true, the original element is returned, otherwise NULL is returned. The example operation "S % S->S" replaces all occurrences of a sub-operation within an operation with an empty string, and the example operation "S % N->S" removes the first n characters from a string, if n<=string length. COMP indicates standard comparisons (e.g., =, <, >, <=, >=, <>), in which the compared elements are of the same type. NOT returns true, if the element is equal to NULL, and UPPER translates a string to upper case. The term NULL indicates a "false/empty" value for the respective type, meaning false for Boolean values, " " (empty string) for strings, 0 for numbers and the first of January 1900 in the case of dates. IFF returns parameter two, if parameter one is true, and returns parameter three, if parameter one is false. Parameter one is of type Boolean, and the other parameters are not checked.

Complex filtering can also include the use of arithmetic operations. The following example can be considered:

SearchResFlightRel/FlightBookRel[(@SMOKER+@INVOICE)="X"]/*$

This example uses arithmetic operators, in this case as a string operator. Both fields used are either "X" or empty. Consequently, the expression evaluates to true if exactly one of the flags is set. More complex examples of arithmetic operations, are provided below with regard to assignments.

BPATH further provides a set of functions. Example functions include Index( ) and Size( ) Index( ) returns the index of the most inner object in the surrounding collection, and Size( ) returns the size of the surrounding collection. An example of this function includes:

SearchResFlightRel/FlightBookRel[INDEX( )=(SIZE( )2)]/*$

Other examples include Not( ) and Today( ) The Not( ) function is discussed above, and the Today( ) function returns the current date. An example of these functions includes:

SearchResFlightRel/FlightBookRel[Not(@ORDER_DATE>(Today( )-400))]/*$

This example returns all bookings that are not done less then 400 days ago.

Other example functions include Iff( ) and Upper( ), which provides a question mark operator that can be used for enumerations, as well as filtering. The following example can be considered for filtering:

SearchResFlightRel/FlightBookRel[@LUGGWEIGHT<IFF(UPPER(@INVOICE)="X",22,20)]/*$

In this example, filtering is done against the weight of the luggage which has to be below a first threshold (e.g., 20 kgs) for non-invoicers, and below a second threshold (e.g., 22 kgs) for flyers marked as "x" for INVOICE. An upper case transformation can be performed on the invoice field.

BPATH further provides for assignments including basic assignments, complex assignments and expressions on targets. The concept of assignments enables the content of fields to be calculated on every level. The target is prefixed with an exclamation "!" and corresponds to a field of the target structure, which is explicitly defined. An example code for basic assignment includes {!F=@V}. The following example statement for a basic assignment can be considered:

~CRMT_NAME_VALUE_PAIR/SearchResFlightRel{!NAME=@CITYFROM}/FlightBookRel{!VALUE=@PASSNAME}/*$ Note that the move-corresponding initiated by the *$ at the end of the example source code is benign, because no fields are transported. The right side of the assignment works with the same evaluation engine as used with filter. Consequently, it is possible to state more complex assignments. An example code for a complex assignment includes {!F1=(@C&"/") &@D; !F2=@E}, which includes complex assignments separated by a semicolon. The following example statement for complex assignment can be considered:

~CRMT_NAME_VALUE_PAIR/SearchResFlightRel{!NAME=(@CITYFROM&"/")&@CITYTO;!VALUE=TODAY( )-@FLDATE)

Two or more assignments can be separated using a semicolon.

Using the example code {!F:=!F+1}, a target can refer to itself in the assignment. The following example statement can be considered:

~CRMT_NAME_VALUE_PAIR/SearchResFlightRel{!NAME="NO Boardings";!VALUE=""&((0+!VALUE)+1))}/*$ In this example, the second assignment illustrates how an assignment can refer to its own target, or other fields of the target structure), and performs counting (!VALUE is increased by 1 with every entry). The example statement is a bit more complex than required, because !VALUE is declared as a string, where an operation as +1 would not make sense. Generally, all operations include some automatic conversions where possible. For example, if a string is added to a number (e.g., (@N+@S)), the result will be a number where the string is interpreted as number. If, however, a number is added to a string (e.g., (@S+@N)), the number is converted to a string and concatenated to the string. This means that 0+@S and " "+@N are simple conversions.

BPATH further provides enhanceable structures, which includes adding new fields to structures. Example code includes ~*STRUC, which includes enhanceable structure, and ~*/, which includes empty structure, a special type of enhanceable structure. For enhanceable structure, the following example can be considered:

~*CRMS_BOL_UIF_TRAVEL_BOOK_KEY/SearchResFlightRel {!Newfield=Index( )}/FlightBookRel/*$ By placing a star (*) between tilde (~) and structure name, artificial fields are allowed to be added to the structure. Each new field is added as soon as it is used as an assignment target somewhere in the BPATH source code. The type of the new field follows the type of the right side of the assignment. If the new field is used a second time, the field will correspond to the already added field.

With regard to empty structure, the following code example can be considered:

~*/SearchResFlightRel{!Newfield=Index( )}/FlightBookRel/*$

As long as there is no attribute added, the structure exists only a virtual structure. If attributes are added, the structure is created from scratch. That is, a new structure is created and includes only artificial fields.

BPATH further provides for accumulations and aggregations of data, which is related to the assignment functionality introduced above. Aggregations are discussed in further detail below. In some instances, detailed data is not desirable. In such instances, the data can be accumulated and aggregated to provide more useful data summaries, for example. FIG. 11 provides Table 6, which includes example aggregations supported by BPATH. In Table 6, the letters S, D, B, N refer to example datatypes string, date, Boolean, and number, respectively. The GRPINDEX function, for example, includes a first parameter of type Number followed by a second parameter of any type. As another example, the CONC function has either two parameters of type string, or two string parameters followed by a Boolean as a third parameter.

The code !VALUE provides for data accumulation, and the following example can be considered:

~*/SearchResFlightRel{!VALUE=0}$/
FlightBookRel{!VALUE:=!VALUE+1}/*

In this example, $ no longer appears at the end of the statement, and instead appears after the first relation. This is because $ indicates when an entry is to be written to the return table. In this example, an entry for every booking found is not desired, only entries for every flight. All assignments are done on the way downward, which means the left assignment is done first and then the corresponding increment operations. In cases where data coming from the sub-tree is to be used for calculations higher up the tree (e.g., calculating the average), the calculation can be performed on each lower level and each calculation overwritten by the previous calculation, such that the last calculation is used.

With regard to aggregations, the following example statement can be considered:

~*/SearchResFlightRel{!VALUE=0;!WEIGHT=0}$/FlightBookRel
{!VALUE:=!VALUE+1;!WEIGHT:=!WEIGHT+(1000*@
LUGGWEIGHT);!AVG=!WEIGHT%!VALUE}/*

In this example, the test against division by zero can be omitted, because the calculation is only done if the value is at least 1. The example calculates the number of bookings (in !VALUE), the complete luggage weight (e.g., in grams), and the average weight (e.g., in grams).

BPATH further provides for dereferencing using the code * !x^!=. In some instances, dynamically constructed assignment targets are dealt with (e.g., exporting data to excel and writing a dynamic second dimension). The following example statement for dereferencing can be considered:

~*/SearchResFlightRel{!TEST="HALLO"}$/FlightBookRel{!CTX=
"PS"+INDEX( );!CTX^!=@PASSNAME}/*

In this example, $ moves to the front, immediately before SearchResFlightRel. Because the return structure is empty at this point, a test field is introduced. The second assignment block first fills the CTX field using a newly constructed field name (e.g., PS1, PS2, . . . ). The second assignment takes the content of CTX, dereferences the content as target, and fills the content with the passenger name (i.e., Passname) of the current attribute structure. In some implementations, dereferencing can be used to transpose a row associated with business object data to be provided as a column in the target output.

It is also possible to use dereferencing within an expression and to dereference attribute fields (!TEST^@). In the above example, a flight has about 450 bookings, so the fields PS1, PS2, . . . PS450 would be added and filled to the return structure. Performance, however, is kept in mind. Accordingly, all new fields are added one by one, and, as in our example where we return a table, the structure for row x (which has 100 fields added, for example) is not necessarily the same as for row x+1 (with 102 fields, for example). Consequently, they can not be added to the same table. As such, a new table with the structure for row x+1 is constructed and all old entries are converted to this new structure.

BPATH also provides sub-functions including sub-functions returning attributes, sub-functions returning references and sub-functions returning structures or tables. The code SUB(<some path>/@FIELD) can be implemented for returning attributes, and the following example statement can be considered:

~*/SearchResFlightRel{!DIST=SUB(FlightConnectionRel/@DIS-
TANCE);
!VALUE=0}$/FlightBookRel{!VALUE=!VALUE+1}/*

SUB( . . . ) virtually instantiates a new parser interpreting the statement from the current object (here "FlightConnectionRel/@DISTANCE") and adds the result as new field. This can be extended from requesting a single field to requesting multiple fields. To request multiple fields, the fields are either included as references, discussed further below, or multiple sub-statements are specified. This does not adversely affect performance, because the relation is only read one time from the database.

The code SUB( . . . /*) can be implemented for returning structures or table. The following example statement can be considered:

~*/SearchResFlightRel{!DS=SUB(FlightConnectionRel/*);!VALUE=0}$/
FlightBookRel{!VALUE=!VALUE+1}/*

Although this looks similar to the example code provided above, a sub-request for structure is made instead of for an attribute. The sub-requested structure is then included into the target structure as reference. This can also be achieved with sub-requests returning tables, which are also included as references.

BPATH also provides for string comparisons and string functions. The code STRCOMP( ) can be implemented for string comparisons, and the following example can be considered:

SearchResFlightRel/FlightBookRel[strcomp(@PASS-
NAME,"CA","äöüÄÖÜ")]/*$

The string comparison function offers the string comparison functionalities as provided in ABAP. Example string comparison functionalities include: contains any (CA), contains string (CS), contains pattern (CP), contains only (CO), contains not only (CN), contains not any (NA), contains no string (NS) and contains no pattern (NP). The parameters are all of the type string and are provided in the same order as in ABAP. This means that the comparator is specified as the second parameter. The string comparison function returns a Boolean value.

The code ~= can also be implemented for the CP string comparison functionality. The following example can be considered:

SearchResFlightRel/FlightBookRel[@PASSNAME~="sch*"]/*$

BPATH further supports basic string functions. Example basic string functions include: LEN(string), LEFT(string, len), RIGHT(string, len) and MID(string, offset, len). The basic string functions do not crash, if len exceeds the string length, or if the offset exceeds the length. The following code example can be considered:

```
~LISTZEILE/SearchResFlightRel/FlightBookRel[LEN(@
PASSNAME)>0][LEFT(@PASSNAME,1)=UPPER(RIGHT(@
PASSNAME,1))]{!ZEILE=MID(@PASSNAME,1,LEN(@
PASSNAME)-2)}\*$
```

This example code takes all non-empty passenger names where the first and the uppercased last character are equal and returns the content in between.

BPATH includes the concept of local versus global assignments. Because targets are not declared, the difference is expressed with the assignment itself. In particular, a local target is cleared after a row is written to the return table. The content of a global target remains after writing to the return table. Locality is expressed with the =operator, and the :=operator is used for global. Technically, the return structure is cleared completely after adding a row to the return table. The content of the global targets is filled again as is done with the last assignment that is stored in the global variable table, as discussed further below. The following usages can be noted:

1. For normal fields written by each and every row, local assignments with = should be used.
2. De-referenced entries only touched by selected rows and valid only for these rows, local assignments are used.
3. Summation (concatenation . . . ) fields use global assignments.

BPATH also provides for global variables. As discussed above, data can be assigned to targets that are part of the returned data. In some instances, a user may want to calculate and store data that is not immediately used within the target structure. To do so, a global variable table (GVT) is introduced, which stores all variables. The GVT can be provided as a hash table with the variable name as key.

In general, the following rules can be applied:
1) All identifiers beginning with a number are treated as variable (e.g., !1 refers to a variable and also !0Var, and !Var refers to a target (an attribute in the returned structure)). Attribute names beginning with numbers are not allowed in data structures.
2) Speaking names without numbers can be used by implementing the !! variable. The second ! indicates that it refers to a variable.
3) A variable is always global. Consequently, the variable remains at least until the complete statement is executed.
4) All sub-queries share the same variable table.
5) A variable is initialized with the first usage on the left side of an assignment.

The following example statement for aggregation was provided above:

```
~*/SearchResFlightRel{!VALUE=0;!WEIGHT=0}$/FlightBookRel
{!VALUE:=!VALUE+1;!WEIGHT:=!WEIGHT+(*1000@
LUGGWEIGHT);!AVG=!WEIGHT%!VALUE}/*
```

For aggregations with global variables, the code !1= or !!VAR=can be used. Using the global variable, the query from this example can be provided as:

```
~*/SearchResFlightRel{!1=0;!!SUM=0}$/FlightBookRel{!1=!1+1;
!!SUM=!!SUM+(1000*@LUGGWEIGHT);!AVG=!!SUM%!1}
```

In some cases, the initialization of aggregation data is difficult, or even impossible. In the case where a query starts from a collection, an assignment on the highest level, which is the collection, is not available. This means that, if the collection contains three items, for example, any assignment is executed at least three times. For dereferenced summations, it may be also impossible to know whether the target is available or must be instantiated.

To deal with this, BPATH provides a GET function including a GET(x,y) method. The GET(x,y) includes the following example semantics: if x can be evaluated, x is returned; if the evaluation of x leads to the access of a non-initialized variable, target or attribute, y is used to initialize the return. A typical usage can include !s=GET(!s,0)+1. It should be noted that a failed access is propagated. This means that a statement such as !s=GET(!s+1,1) would lead to the same result as the statement before. GET methods can also be nested.

The following example statement illustrates a non-trivial usage of the GET function, in a scenario where it can not be avoided, because the field is dynamically added:

```
~*/SearchResFlightRel$/FlightBookRel{!1=LEFT(@PASSNAME,1);!1=
IFF(!1="","EMPTY",!1);!1^!:=GET(!1^!,0)+1}
```

This example code extracts the first character of the passenger name. The IFF statement is used to avoid creating fields with empty names. Access to the column with the corresponding name (e.g., column A) is attempted. If the column is available, its value is increased by one. If the column is not available, it is created. With respect to empty names, the functionality is executed against a field "EMPTY," which holds the number of entries without filled passenger names. Further, any created field is initialized by 1 (or, more precisely, 0+1).

BPATH also provides for unstructured returns. In particular, and to enable easy accesses to the data, unstructured return types are provided. Example unstructured return types include integer values and strings. A simple rule is provided: if the declared return type is not structured, every write access to it is treated as writing to the value itself, irrespective of the target name used. Read access is not supported. Instead, global variables are used. The code ~INT2 or ~STRING can be implemented for unstructured return data. The following example statement returns the index of the first passenger beginning with "S":

```
~INT2/SearchResFlightRel/FlightBookRel[@PASSNAME~=
"S*"]{!RETURN=INDEX( )}
```

BPATH also provides for sorting of the result table. This feature includes the sorting of sub-query result tables. Sorting is treated as a feature of the structure definition. This means that, if the result is to be sorted, the structure is to be stated explicitly. Dynamic structure definitions as ~* are supported. Sorting field names are added and are encapsulated by [ . . . ]. The sort-order ('A' (ascending) or 'D' (descending)) may be added as an option and can be triggered with a colon (default is ascending order). An option 'T' (text) can be used to sort data as text. The * operator can be used to indicate the current order. This means that, if a * is part of the sort order definition, a stable sorting is performed.

The code ~*[!FIELD:AT,*] is used for sorting. An example sorting statement can be considered:

```
~*CRMS_BOL_UIF_TRAVEL_BOOK_ATT[!FORCURKEY,
!FORCURAM:A,*]/SearchResFlightRel{!DS\:=SUB(~*[!CONNID:DT]/
FlightConnectionRel/*)}/FlightBookRel/*$
```

In this example, the inner sort order is for display purposes. The sub-query anyway returns only one entry in the table. The sorting is performed at the very end of the evaluation. Sorting used for filtering, assignments, etc. remains as defined by the underlying relations.

BPATH further provides for direct indexing, which positively impacts performance. Specifically, any filter returning a numeric value is directly indexed, if it fulfills certain conditions. Directly indexed means that only the requested entity is evaluated and all other datasets are ignored. Example conditions include: no access to any attribute in the filter, no sub-query in the filter, and no assignment block between relation and filter. The result of any query is not changed. It should be noted that negative indexing refers to entities counted from the end of the list (i.e., −1 is the last object in the collection). The syntax does not enable the use of negative literals directly (e.g., [−1] is specified as [0−1]). As an example, the following statement can be considered:

```
~STRING/SearchResFlightRel{!!Dummy=0-1}/FlightBookRel
[!!Dummy]/
@PASSNAME$
```

BPATH also provides for parser reuse, which can improve performance in certain use cases. When instantiated, the parser builds a parse table. When the parser receives the tokenized source code, a pre-parsing is performed. In some implementations, building of the parser table is only performed for the first statement, if several BPATH statements are executed. In some implementations, the pre-parsing is only performed if the source code has changed. To enable reuse of the parser object, and consequently omitting building of the parser table and pre-parsing, the parser object may be instantiated under the control of the application and handed over to the corresponding BOL method. The following ABAP example illustrates this:

```
Data MyParser type ref to CL_WCF_BPATH_PARSER.
create object MyParser.
LV_SOURCECODE = 'SearchResFlightRel/*$'.
MyResult1 = lv_object->
GET_PROPERTIES_BY_BPATH(IV_BPATH_STATEMENT =
LV_SOURCECODE IO_PARSER = MyParser ).
MyResult2 = lv_other_object->
GET_PROPERTIES_BY_BPATH(IV_BPATH_STATEMENT =
LV_SOURCECODE IO_PARSER = MyParser ).
```

In this example, the second call reuses the parsing tables of the first call and, because the source code is the same, the second call also reuses the pre-parsing tables.

In general, the modes of parser include a first mode, a second mode and a third mode. The first mode includes checking the syntax of the source code, and can do some pre-parsing. The second mode includes a model check mode, which does not execute the query as such and performs certain functionality. Example functionality includes checking syntax, checking validity of used relations and attributes against a model, and returns the (empty) data structure. The third mode executes the query. The second and third modes provide pre-parsing before execution. Because the mode runs against the model, and not against actual objects/collections, the object name (plus namespace which is otherwise defaulted with '') is provided instead of object or collection instance. An example syntax is provided as follows:

```
DATA: lv_bol_core TYPE REF TO cl_crm_bol_core.
lv_bol_core = cl_crm_bol_core=>get_instance( ).
MyResult = lv_bol_core->GET_PROPERTIES_BY_BPATH
(IV_BPATH_STATEMENT = LV_SOURCECODE
IV_BASE_NAMESPACE = ''
IV_BASE_OBJECTNAME = 'UIFSearchResFlight'
IV_EVAL_MODE = 2 ).
```

The syntax check is the same in all three modes. In the case where the return type is a table, the table will contain exactly one row. The fields in this row should be empty except for the cases described below. This also applies to returned structures. The relation check, as well as the data structure, return has some limitations due to the flexibility of GenIL as well as BPATH. GenIL is an example framework in which BPATH can be embedded. GenIL can be provided as a twofold framework including the Business Object Layer (BOL) on top and the Generic Interaction Layer (GenIL) below. Other frameworks can be implemented (e.g., Business Object Processing Framework (BOPF), and SAP Business Object framework). The parent relation leads to an unambiguous object type only with an instantiated object. As for the model, the relation may be ambiguous (e.g., the parent of an address might be a contact or a business partner). Because it is unclear with which object type to proceed and whether the relations/attribute accesses that follow are correct, the model checks stop whenever a parent relation is used with more then one possible parent. It is recommended that the parent relation be made unique in such cases.

BPATH also provides for attributed parent relation. Specifically, the parent relation (' ... ') may have an attribute that holds the object name of the parent. The following example statement illustrates such a case:

~*/SearchResFlightRel/FlightBookRel/..._UIFFlight/*$

This example uses the code ..._OBJECT, which provides for the attributed parent relation. This is not a syntax change. For BPATH the relation name is ' ... _UIFFlight'. The objectname of the parent object is used to identify the object on which the check is performed during model check. As with normal statement execution, the object name information is ignored.

The return type of some functions may be unknown at design time. The following example statement illustrates such a case:

~*/SearchResFlightRel{!RetVal:=ift@CONNID=14,1, "Hello")}

At run-time, the type is determined with the first access.

De-referenced targets on the left side of an assignment lead to fields where the name is unknown at design-time. The following example statement illustrates such a case:

~*/SearchResFlightRel{!1:="F"+@FLDATE;!1^!=1}

The model check generates a field named 'UNKNOWN-FIELDNAME n' into the result structure. Several de-referenced assignments lead to several entries. One de-referenced assignment may lead to more than one added field at run-time, but only to one within model check.

De-referenced targets on the right side of an assignment lead to fields where the type is unknown at design-time. The following example code illustrates such a case:

~*/SearchResFlightRel{!1:=ift@CONNID=14,"CON-NID","FLDATE");!Ret=!1^!}

In such cases, the model check creates a field with type string containing the value: UNKNOWN DATATYPE.

To use the syntax check or model check, the exceptions caused by syntax errors have to be caught. An explanation of possible exceptions are discussed in further detail below.

Using a @@ as a prefix, BPATH returns the result of the GET_TEXT method as the result, instead of the attribute directly. This is the longtext, if available.

Otherwise, this is an empty string. The result type is always string. The code @@CARRID provides for the attribute longtext. An example statement can be considered:

~*/SearchResFlightRel/FlightBookRel{!A=@@CUSTTYPE;!B=
@@CARRID;!D=@@CLASS;!E=@@FORCURKEY}$ BPATH provides full support of numeric values and numeric literals with decimals. The internal numeric format is provided as DECFLOAT34. BPATH also enables write down of (positive) numeric literals with a digit. In general, all internal calculations are done with DECFLOAT34 instead of P16, the return types of fields basing on internal calculations are also DECFLOAT34, numeric literals including decimal points as 0.5 and 23.001 are possible, the period (dot) may not be the first character of the literal (e.g., use 0.5 instead of 0.5), and negative numeric literals (e.g., −1) are not directly expressed, because the minus sign would be interpreted as a minus operand (e.g., use 0-1 instead of −1).

The following example illustrates a numeric calculation:

~*/SearchResFlightRel/FlightBookRel[@LUGGWEIGTH>23.5]{!A=
@LUGGWEIGHT;!B=@LUGGWEIGHT*2}$ In this example, A is of type P(5) DEC 4, which means it is of the same type as the original attribute. B is of type DEC-FLOAT34. To avoid shortdumps during BPATH execution, which may not be identified during syntax or model checking, some additional semantical changes are implemented on the evaluation of numeric expressions. Example changes include: divisions by zero are caught and the result is set to 0; and attempts to fill a numeric value with a non-numeric string (e.g. !A=1+"Test") are caught and the result filled with 0.

BPATH also provides for token-based and character-based code completion. The code completion offers improved functionality to the user based on existing modes. In particular, a code fragment is checked (with relations and attributes). At the end of the fragment, where the check typically fails, the parse tables are referenced to return the information as to which proceedings are possible.

With token-based code completion, the code fragment is interpreted as a sequence of complete tokens. This means that the right most token cannot be split, and hence, cannot be a fragment of a new token. Because tokens are transparent to the user, the token-based mode is typically used when the fragments are assembled from a given set of building blocks (e.g., tokens). With character-based code completion, the code fragment is interpreted as a sequence of characters. This means that the right most token might be incomplete. Consequently, an additional check is made as to how the token can be completed.

The difference between token-based and character-based code completion can be visualized by the example fragments ~*/MyRel[@Name< or ~*/. Token-based code completion interprets the "<" and the " ." as correct and complete tokens, and expects a new token. Character-based code completion also allows the cases where the "<" is part of a "<=" or a "<>" and the " ." is part of a " ..". The same is valid for identifiers, which means a !N may be part of a bigger target !NewValue, and a SearchAccounts may be part a the relation SearchAccountsOnName. Code completion returns the data in a table of type CRMT_BOL_BPATH_COMPLE-TION_TAB.

BPATH also provides direct attribute retrieval. In one example, an attribute can be copied from the current structure using the example code {@FORCURAM;@FORCURKEY; @@CUSTTYPE}. The following example statement can be considered:

~*/SearchResFlightRel/FlightBookRel{@FORCURAM;@FORCURKEY;
@@CUSTTYPE}$

Direct attribute retrieval function for enhanceable structures and non-enhanceable structures. For normal fields, a target with the same name is used. For long text fields, the suffix '_LONG' is appended to the target name. The assignment block in the example statement provided above is simply a shortcut for the slightly longer syntax (i.e., {!FORCURAM=@FORCURAM;
!FORCURKEY=@FORCURKEY;
!CUSTTYPE_LONG=@@CUSTTYPE}).

In general, any assignment based on expressions or functions has a well defined result. In some cases, this may not be true. One such case includes the right side of the assignment containing a sub-function, because the sub-function returns initial, if the BPATH query can not be executed until the end (e.g., typically if a relation is used which delivers no elements). Originally, the initial reference is assigned to the target structure, which can lead to dumps. Accordingly, assignments to initial references are not executed. If there is a valid entry afterwards, a column will be created including the omitted entries. If there is no valid entry afterwards, the column will not be part of the target structure.

BPATH also provides for groupings. In some implementations, a basic grouping can be provided using the example code $(@AGENCYNUM,UPPER(@SMOKER)). The following example statement can be considered:

~*/SearchResFlightRel/FlightBookRel$(@AGEN-CYNUM,UPPER(@SMOKER))

In this example, the $ is attributed with a list of group elements (i.e., agencynum and smoker). The group element is not necessarily an attribute and any expression is valid. A new entry is written to the result table in case the combination of group elements in the actual dataset has not already appeared in the result table. The result table contains the first entry of every group. In the provided example, a list of 4116 entries is condensed to about 70 entries, for example. The standard behavior of the grouping automatically adds the grouping conditions to the result table.

In some implementations, naming of the group conditions follows particular rules. Example rules can include: if the condition consists of an unchanged attribute, the name of the attribute is taken; if an attribute is used, but changed by the usage of a function or an operator, and without usage of a second attribute or a target, the attribute name will be preceded by a "F_"; and, in all other cases, the name will be EXPR_i, where i is the number of the respective condition. In the examples provided above, the two attributes would be named AGENCYNUM and F_SMOKER.

In some implementations, automatic adding of the group condition can be suppressed (e.g., in cases where the group condition is added manually, as discussed further below). This is possible with an exclamation mark after the dollar as provided in the example code $!(@AGENCYNUM,UPPER(@SMOKER)). The following example statement can be considered:

~*/SearchResFlightRel/FlightBookRel$!(@AGEN-CYNUM,UPPER(@SMOKER))

BPATH also provides for grouping using assignments, which can be described as hand-made aggregations. In some implementations, the grouping syntax is extended to build assignments based on the group data. Example context can be provided as $(ListGroupIdentifier:Initblock:Loopblock). In this example, ListGroupIdentifier is a non-empty comma separated list of expressions defining the groups as discussed above, and Initblock is a block with assignments (separated with ;) processed with the first element of every group. Loopblock is a non-empty block with assignments processed with every element of a group.

In some implementations, any used target variable in one of the two group assignment blocks refers to the "group" element. As with normal assignments, an assignment can include an attribute only, abbreviating an assignment to a target with the same name. Because, it is natural to have grouping attributes in the result, it may be added to the init block as in the example provided below. In some implementations, it is also possible to sort the result on any of the fields, including fields built by aggregation.

Example code for providing hand-made grouping aggregations includes $(@FORCURKEY:!X=0:!X=!X+1). The following example code can be considered:

~*[!AVG]/SearchResFlightRel/FlightBookRel/$(@FORCURKEY:!Sum=0;!Amt=0:!Sum=!Sum+1;!Amt=!Amt+@LOCCURAM;
!AVG=!Amt%!Sum)

In this example, bookings are grouped according to foreign currency and the number of bookings in this currency is calculated. The complete amount (in USD) and the average amount (also in USD) is provided.

BPATH also provides grouping to structure, and can be provided by the example code $(*:!X=0:!X=!X+1). The following example statement can be considered:

~INT2/SearchResFlightRel/FlightBookRel/$(*:!Sum=0:!Sum=!Sum+1)

In this example, the complete content can be grouped to a single row, and the result can be provided as a structure with the field sum, instead of a table.

BPATH provides a plurality of functions. Example functions can include a list function (List( )), a rounding function (Round( )), an integer function (Int( )), a log function (Log( )), and an exponent function (Exp( )). The list function includes the following syntax: LIST(target,separator,content). The list function can include the example code {!X:=List(!X,",",@Feld)}. The following example statement can be considered:

~STRING/SearchResFlightRel/FlightBookRel{!Ret:=LIST(!Ret,",",@PASSNAME)}$

The list function includes the following example characteristics: the separated two entries do not appear as the first or last character; like the GET( ) function, the first parameter may not be available (e.g., if !X does not exist, it is defaulted with an empty string value); and LIST considers empty fields (e.g., in the above example, @PASSNAME is " ") as empty and they are not added to the list.

The round and integer functions use the ABAP round function with the modes ROUND_HALF_UP and ROUND_DOWN.

The log and exponential functions respectively return the log and exponential of a first parameter using base e. If a second parameter is provided, the second parameter is used as the base. The example code $(int(Log(@LOCCURAM,10)) provides log function and log grouping. The example statement illustrates the use of the log function and log grouping for business applications:

~*/SearchResFlightRel/FlightBookRel$(int(Log(@LOCCURAM,10)):!
LMIN=round(exp(int(Log(@LOCCURAM,10)),10),2);!LMAX=
round(exp(1+int(Log(@LOCCURAM,10)),10),2):!CNT=Count( ))

In this example, the whole value of the decimal logarithm of the base value is grouped to. This means the number of digits of the dollar amount. The LMIN and the LMAX value calculate the borders of our area (e.g., [100 . . . 1000] and [1000 . . . 10000]). It can be noted that the border calculation is part of the init block, hence it is calculated once for every group. Although the above example is an artificial example, the concept that is illustrated may be useful to group customers/products/projects, where the range may be between pennies to millions of dollars.

BPATH also provides an exists function (Exists( )), a safe function (Safe( )), an initial function (Initial( )) and a word on comparisons on data references. These functions deal with the possibility that a sub-function may return no result (i.e. an initial reference). These functions are provided to catch that problem or react to it. The exists function has one parameter (e.g., a sub-call), and returns true if the parameter is not an initial reference (i.e., if the sub-query returned data). The safe function has two parameters, the first one typically a sub-call and the second one a default value. The default value can be chosen in the case where the first parameter is an initial reference. This is distinguished from the GET( ) functionality, which has similar syntax but different semantics. The initial function returns the initial value of the handed over type (e.g., 'S', 'D', 'B', 'N', 'R', 'O'), if set. If the initial function is used without a parameter an initial reference is returned. The comparison functions enable a comparison against the INITIAL-value.

BPATH also provides aggregations for aggregating a number of datasets to one value. These can include the COUNT function, the SUM function and the AVERAGE function. Other aggregations can include the MIN function, the MAX function, the FIRST function and the LAST function. More complex aggregations can include the SEARCH function, the GEOAVG function and the STDEV function. A list of aggregation functions is provided in Table 6 of FIG. 11.

In general, all aggregations refer to a group, and can be used in the loop-block of a group definition. Aggregations on a full dataset (as opposed a group) can be achieved using the example code $(* . . . ) either in the main query or in a sub-query. The initialization part is automatically done by aggregation. Unlike the examples of handmade aggregations, the Initblock of the group definition typically remains empty. Aggregations can be built upon every valid BPATH expression. Any aggregation that is at the intermediate state of processing row i (i being smaller than the total number of rows in that group) will have the value as if i was the last row in that group. Consequently, nested aggregations may return different results than anticipated (e.g., a statement COUNT (@AMOUNT=MAX(@AMOUNT)) counts all rows that have no larger AMOUNT in a row smaller than its own row, instead of comparing with the global maximum). In some implementations, a handmade solution can be provided. The example code illustrates such a handmade solution:

```
$(MyGroup:!t=0;!a=0:!t=iff(@AMOUNT>!a,1,iff(@AMOUNT=
!a,!t+1,!t);!a=iff(@AMOUNT>!t,@AMOUNT,!a))
```

Basic aggregations can include Count( ), Sum( ) and Product( ) aggregations. The example code $(@GROUPHX=Count( )!Y=Sum(@FELD)) can be implemented for count and sum. The following example statement can be considered:

```
~*[!CLASS]/SearchResFlightRel/FlightBookRel$(@CLASS::!COUNT=
Count( );!SUM=Sum(@LOCCURAM))
```

Although this example statement is self-explanatory, the count function can be enhanced with a condition. In such a case, only rows fulfilling the condition are counted. As with the sum function, the same can be achieved using a sum(iff (condition,@Feld,0)) construction. The product function operates like the sum function, but multiplies all available parameters. This can be useful for probabilities. In such cases, the result may be a fraction, so the ability to round the result is provided.

The concatenate function (Conc( )), the average function (Avg( )), the geometric average function (Geoavg( )) and the standard deviation function (Stddev( )) can be considered advanced aggregations. The code example $(@@GROUP:: !X=Avg (@Feld,Prec);!Y=Conc(@FELD,Sep,Cond)) implements the average and concatenate functions. The following example statement can be considered:

```
~*[!CLASS_LONG,!FORCURKEY]/SearchResFlightRel/Flight-
BookRel$
(@@CLASS,@FORCURKEY::!Average=AVG(@LOCCURAM,2);!
PASSENGERLIST=CONC(@PASSNAME,",",@PASSNAME<>""))
```

In this example, the average function without the second parameter returns a value with 34 digits. This may not be desired. Consequently, it is possible to add the number of decimal places as the second parameter. The concatenate function concatenates the handed over value, a first parameter, separated by a second parameter. As a third parameter, a condition can be specified. In such a case, the concatenate function is used to sort out non-filled entries. The geo average function calculates the geometrical average (e.g., the nth root on the product of all elements), and the standard deviation function calculates the standard deviation.

BPATH further provides a minimum function (Min( )) and a maximum function (Max( )). The example code $(@GROUP::!X=Min(@Feld,Returnvalue)) uses the minimum function. The following example statement can be considered:

```
~*/SearchResFlightRel/FlightBookRel$(@@CLASS,@FORCURKEY::!
R=Min(@LOCCURAM,concatenate(@PASSNAME," paid ",""+
@FORCURAM,"",@FORCURKEY)))
```

In this example, the result is assembled based on the first min/max row found using the second parameter. If no second parameter is provided, the min/max value is directly returned. The example statement for the average and concatenation functions provided above, illustrates that aggregations are not necessarily based on attributes directly. This example calculates the maximum paid for a kilogram of luggage with the side condition that the weight should be greater than zero. Using the iff( ) function provides a standard way to deal with this side condition.

The code example $(*::!X=Max(function(@Feld1, @Feld2))) uses the maximum function. The following example statement can be considered:

```
~*/SearchResFlightRel/FlightBookRel$(*::!R=Max(iff(@LUGG-
WEIGHT>
0,@LOCCURAM%@LUGGWEIGHT,0))
```

This example includes a maximum function based on a complex expression. This example statement is used to calculate the maximum a traveler has purchased per weight (e.g., kilogram) of luggage, encountering only flyers with luggage (i.e., excluding passengers where @LUGGWEIGHT=0).

Less complex aggregations can include a first function (First( )), a last function (Last( )), a group index function (GrpIndex( )) and an any function (Any( )). The first function returns the value corresponding to the first row, and the aggregation can include a condition. The group index function can be used to access the $n^{th}$ row, where n is the first parameter and the second parameter specifies the value to be returned. The any function a randomizer library to choose an arbitrary row, from which the return is assembled.

BPATH also provides a search function (Search( )) and a search first function (SearchFirst( )). The search and the search first functions search for specific rows that fulfill a specified search condition. The search first function selects the first found entry, searches all, or the last row when no self-linking is used. The example code $(*::!X=SearchFirst (@F1,@F2)) uses the search first function. The following example statement can be considered:

```
~*/SearchResFlightRel/FlightBookRel$(*::!R=SearchFirst(@
LUGGWEIGHT>30,@Passname))
```

The example code $(*::!X=Search(Cond,func(!X))) can be used to return lists assembling the search result. The example statement can be considered:

```
~*/SearchResFlightRel/FlightBookRel$(@@CLASS::!OVERWGHT=
Search(@LUGGWEIGHT>24,LIST(!OVERWGHT,",",@PASSNAME)))
```

This example illustrates the teamwork of the search function and the list function. The search function searches all bookings with "overweight" (e.g., above 24 kilograms) and adds the name of the passenger to the list of passengers having overweight luggage.

BPATH provides a median function (Median( )). The median function sorts the attributes and chooses the one in the middle. The median function is supported for numeric values, strings and dates.

BPATH also provides a to root relation. The example code . . . uses the to root relation. The following example statement can be considered:

~*/SearchResFlightRel/FlightBookRel/ . . . $/*

In addition to the relation to the object itself (" ."), the relation to the parent (" . ."), the relation to the root object is achieved using the . . . syntax. In contrast to the parent, the root is unambiguous.

BPATH provides customer/industry/application specific extensions without harming the core code or security aspects. This is achieved using a function-pool interface provided in BPATH. The interface (provided as IF_WCF_BPATH_FUNCTIONPOOL) works with a plurality of basic functions, which are implemented by the respective class. In particular, a register function (e.g., REGISTER_FUNCTIONS), registers all implemented functions at the parser with some basic information. The basic information can include name, return type (either the type directly or the number of the parameter from which the type is chosen), the number of parameters, the number of optional parameters, and a flag indicating whether the function implements an aggregation function. A process execution function (e.g., PROCESS_EXEC_FUNC) provides execution of a function returning a CRMT_BOL_B-PATH_EXPR_VALUE value, which is the internal ABAP type that is able to hold all data types (e.g., string, numeric, Boolean, date, data reference, object reference). In some implementations, methods of the parser can be changed to PUBLIC, such that they can be accessed from the function pool class. A process abstract function (e.g., PROCESS_AB-STRACT_FUNC) provides execution of a function in a model check mode. The process abstract function returns a correctly typed CRMT_BOL_BPATH_EXPR_VALUE value without content. A check of correctness of the types of the parameters is also a task of this function. In some implementations, function specific coding can be located at the function pool class. In some implementations, generic functions, such as the evaluation of expressions and rounding, can remain under direct control of the parser.

BPATH provides core function pools including a basic function pool (e.g., CL_WCF_BPATH_BASIC_FUNC-TIONS), a basic aggregations function pool (e.g., CL_WCF_BPATH_BASIC_AGGREGATIONS) and a GenIL function pool (e.g., CL_WCF_BPATH_GENIL_FUNCTIONS). The basic function pool contains basic functions (e.g., TODAY, NOT, LEN, LOG). The basic aggregations function pool contains all core aggregations, and the GenIL function pool contains GENIL related functions (e.g., INDEX, SIZE, OBJECT_NAME, OBJECT_ID).

BPATH also enables data to be copied from sub-queries using the example code*=SUB( . . . ). Data returned by a sub-query could be added, if the data included a single field or is a reference to a structure or a table. If adding two fields (e.g., average and standard deviation), two distinct sub-queries would be required, which could affect performance and readability. BPATH, however, uses the star operator as a target, and the data returned by the sub-query is examined. If the data includes a table or an unstructured field, an error is given. In the data includes a structure, all fields of the structure are copied to the result. The following example statement can be considered:

~*/SearchResFlightRel{@CARRID;@CONNID;@FLDATE;*=
SUB(~*/FlightBookRel[@CLASS="Y"]$(*::!Count=Count( );!Average=
AVG(@LOCCURAM,2);!Median=Median(@LOCCURAM)))}$ In this example, a list of flights is provided, from which the keys and data from the sub-query are to be returned. The sub-query works on the bookings using an "aggregate to one value" feature to ensure that the result is a structure and not a table. In this example, the sub-query filters to Class=Y (e.g., Economy Class) and determines the three values count, average and median. In some cases, the flights have no bookings Consequently, the fields remain empty. The result of the query includes a list of keys plus number, average and median amount (e.g., in local currency) of the economy class bookings of the respective flight.

Figure 12:
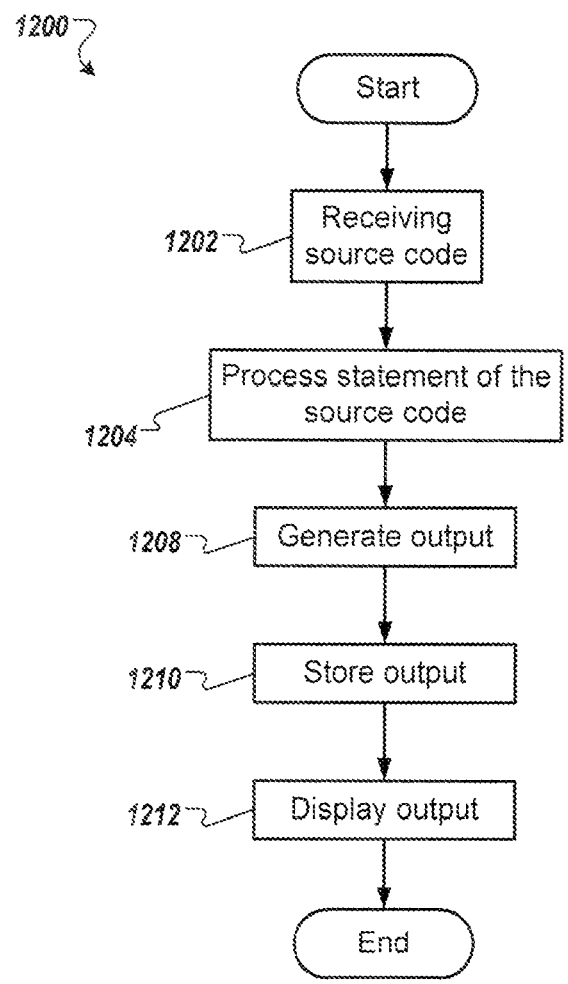
FIG. 12 is a flowchart illustrating an example process corresponding to implementations of the present disclosure.

Referring now to FIG. 12, an example process 1200 can be executed in accordance with implementations of the present disclosure. Source code is received (1202). In some implementations, the source code can be received at a parser, and can include a statement. The statement can include a dynamic character string including one or more relation names, each of the one or more relation names defining a relation between business objects. The statement is processed to generate (1204). In some implementations, the statement is process using one or more processors to access at least one business object, the at least one business object being stored in machine-readable memory. In some implementations, the at least one business object corresponds to at least one of the one or more relation names and includes business object data associated therewith.

Output is generated based on the business object data (1208). In some implementations, the output can include one or more values associated with the business object data. In some implementations, the output can include one or more values that are calculated based on values associated with the business object data. The output is stored (1210). In some implementations, the output is stored to a machine-readable storage device. The output is displayed (1212). In some implementations, the output can be displayed to a user using a display device.

Figure 13:
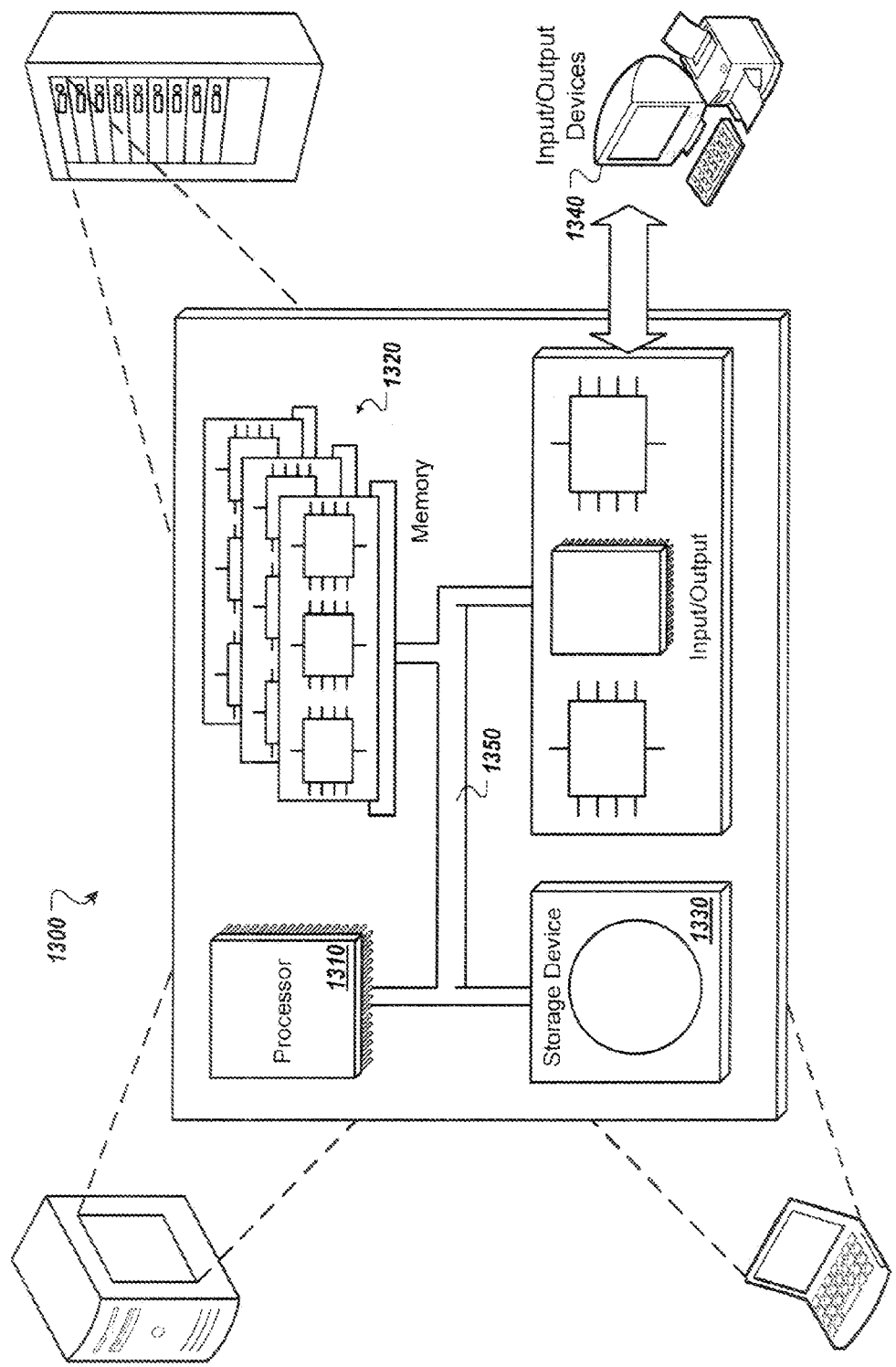
FIG. 13 is a schematic illustration of exemplar computer systems that can be used to execute implementations of the present disclosure.

Referring now to FIG. 13, a schematic diagram of an example computing system 1300 is provided. The system 1300 can be used for the operations described in association with the implementations described herein. For example, the system 1300 may be included in any or all of the server components discussed herein. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one implementation, the memory 1320 is a computer-readable medium. In one implementation, the memory 1320 is a volatile memory unit. In another implementation, the memory 1320 is a non-volatile memory unit. The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device. The input/output device 1340 provides input/output operations for the system 1300. In one implementation, the input/output device 1340 includes a keyboard and/or pointing device. In another implementation, the input/output device 1340 includes a display unit for displaying graphical user interfaces.

As discussed herein, and as highlighted in the several example code statements above, BPATH is an interpreted computer language that enables execution on non-hierarchical, non-finite business data structures. BPATH further provides the following example features: explicitly defining a return structure of the output, assembling new data using assignments, transposing data, implementing sub-queries, using an independent global data dictionary, data grouping, result sorting, the inclusion of functions defined by third-parties, the use of aggregation functions for filtering, grouping and returning data. In contrast to other languages, such as XPATH, which includes a party providing an implementation of the language and a party that is using the language, BPATH enables the integration of function pools. In this manner, using parties cannot change the interpreter code, which could result in destabilized functionality and difficulties in maintainability. In particular, BPATH can be informed that a new function pool is provided. A particular method of the function pool (e.g., REGISTER_FUNCTIONS) is called and provides information regarding the functions in the function pool, as well as which parameters are expected. Other methods are provided by the class and include a first method that takes over the function name and the parameters and is actually executing the respective function, and a second method that performs the syntax check. Accordingly, it is possible to integrate new functionality at each level of BPATH without changing the syntax.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of accessing unstructured business object data, comprising:
   receiving a source code at an interpreter comprising a scanner and a parser;
   lexically analyzing the source code with the scanner to generate a plurality of tokens, each of the plurality of tokens being cached by the scanner in a caching table;
   storing control information in the caching table, the control information indicating a status associated with an action to be performed by the parser;
   generating with the parser an intermediate source code by syntactically parsing each of the plurality of tokens cached in the caching table using a control table generated by the parser, the intermediate source code comprising a statement, the statement comprising a dynamic character string including one or more relation names, each of the one or more relation names defining a relation between a plurality of business objects, the relation and business objects defining a nonhierarchical structure comprising at least one non-recursive loop between a particular pair of the plurality of business objects, the parsing including comparing each token of the plurality of tokens with the control table to identify the action to be performed by the parser, and in response to identifying the action, updating the status based on the control information;

processing the statement using one or more processors to access at least one business object, the at least one business object being stored in machine-readable memory, the at least one business object corresponding to at least one of the one or more relation names, and having business object data associated therewith; and generating an output based on the business object data.

2. The method of claim 1, wherein the statement comprises a structure definition that defines a return structure, the output corresponding to the return structure.

3. The method of claim 2, wherein the return structure comprises a table.

4. The method of claim 2, wherein the statement further comprises a code segment indicating a field, the field being added to the return structure.

5. The method of claim 4, further comprising adding the field to the return structure in response to the field being used as an assignment target within the source code.

6. The method of claim 1, wherein the return structure comprises a plurality of fields.

7. The method of claim 1, wherein the at least one business object is a member of a collection of business objects, business objects in the collection of business objects being identified in response to a query.

8. The method of claim 1, wherein the statement defines a target structure comprising one or more fields and an assignment of data values to the one or more fields, and processing comprises pushing one or more data values of the business object data to the one or more fields based on the assignment.

9. The method of claim 1, wherein the statement defines a plurality of assignments of data values to a plurality of fields, and processing the statement using one or more processors to access at least one business object comprises pushing one or more data values of the business object data to the plurality of fields based on the plurality of assignments.

10. The method of claim 1, wherein the statement defines a transposition of business object data, such that a column associated with the business object data is provided as a row in the output.

11. The method of claim 1, wherein the statement defines the output to be provided as a table that is composed of a first table having a first number of rows and a second table having a second number of rows different that the first number of rows.

12. The method of claim 11, wherein fields are incrementally added to the table and each field of the table corresponds to a field of each of the first table and the second table.

13. The method of claim 1, wherein the output is based on one or more sub-queries, each of the one or more sub-queries providing data, the statement providing a sort order such that the data is sorted based on the sort order.

14. The method of claim 13, wherein a result of at least one of the one or more subqueries comprises a table.

15. The method of claim 1, wherein the statement defines one or more data groups each data group corresponding to a type, and processing the statement using one or more processors to access at least one business object comprises grouping business object data into each of the one or more groups based on the type.

16. The method of claim 1, wherein the statement defines one or more calculations performed on business object data, and processing the statement using one or more processors to access at least one business object comprises performing the one or more calculations on data of at least one or the one or more data groups.

17. The method of claim 1, wherein each business object comprises a virtual instantiation of database content.

18. The method of claim 1, wherein the relation and business objects define the nonhierarchical structure including at least one infinite loop between the particular pair of the plurality of business objects.

19. A non-transitory computer-readable storage medium coupled to one or more processors having instructions stored thereon which, when executed by the one or more processors, cause the one or more processors to perform operations to compare a first private value associated with a first party to a second private value associated with a second party, the operations comprising:

receiving a source code at an interpreter comprising a scanner and a parser;

lexically analyzing the source code with the scanner to generate a plurality of tokens, each of the plurality of tokens being cached by the scanner in a caching table;

storing control information in the caching table, the control information indicating a status associated with an action to be performed by the parser;

generating with the parser an intermediate source code by syntactically parsing each of the plurality of tokens cached in the caching table using a control table generated by the parser, the intermediate source code comprising a statement, the statement comprising a dynamic character string including one or more relation names, each of the one or more relation names defining a relation between a plurality of business objects, the relation and business objects defining a nonhierarchical structure comprising at least one non-recursive loop between a particular pair of the plurality of business objects, the parsing including comparing each token of the plurality of tokens with the control table to identify the action to be performed by the parser, and in response to identifying the action, updating the status based on the control information;

processing the statement using one or more processors to access at least one business object, the at least one business object being stored in machine-readable memory, the at least one business object corresponding to at least one of the one or more relation names, and having business object data associated therewith; and generating an output based on the business object data.

20. A system, comprising:

a display;

one or more processors; and a computer-readable storage medium coupled to the one or more processors having instructions stored thereon which, when executed by the one or more processors, cause the one or more processors to perform operations to compare a first private value associated with a first party to a second private value associated with a second party, the operations comprising:

receiving a source code at an interpreter comprising a scanner and a parser;

lexically analyzing the source code with the scanner to generate a plurality of tokens, each of the plurality of tokens being cached by the scanner in a caching table;

storing control information in the caching table, the control information indicating a status associated with an action to be performed by the parser;

generating with the parser an intermediate source code by syntactically parsing each of the plurality of tokens cached in the caching table using a control table generated by the parser, the intermediate source code comprising a statement, the statement comprising a dynamic character string including one or more relation names, each of the one or more relation names defining a relation between a plurality of business objects, the relation and business objects defining a nonhierarchical structure comprising at least one non-recursive loop between a particular pair of the plurality of business objects, the parsing including comparing each token of the plurality of tokens with the control table to identify the action to be performed by the parser, and in response to identifying the action, updating the status based on the control information;

processing the statement using one or more processors to access at least one business object, the at least one business object being stored in machine-readable memory, the at least one business object corresponding to at least one of the one or more relation names, and having business object data associated therewith; and generating an output based on the business object data.

* * * * *